US007007070B1

(12) United States Patent
Hickman

(10) Patent No.: US 7,007,070 B1
(45) Date of Patent: Feb. 28, 2006

(54) METHOD AND APPARATUS FOR COMPUTING OVER A WIDE AREA NETWORK

(76) Inventor: Paul L. Hickman, 27140 Moody Rd., Los Altos Hills, CA (US) 94022

( * ) Notice: Subject to any disclaimer, the term of this patent is extended or adjusted under 35 U.S.C. 154(b) by 1030 days.

(21) Appl. No.: 08/810,620

(22) Filed: Feb. 28, 1997

Related U.S. Application Data

(63) Continuation-in-part of application No. 08/799,787, filed on Feb. 12, 1997.

(60) Provisional application No. 60/012,905, filed on Mar. 6, 1996.

(51) Int. Cl.
*G06F 15/16* (2006.01)
(52) U.S. Cl. ..................... 709/208; 715/740
(58) Field of Classification Search .......... 395/200.33, 395/200.48, 200.57, 500.59, 200.02, 500; 707/10; 708/208
See application file for complete search history.

(56) References Cited

U.S. PATENT DOCUMENTS

| | | | | |
|---|---|---|---|---|
| 5,228,137 A | * | 7/1993 | Kleinerman et al. | 395/500 |
| 5,241,625 A | | 8/1993 | Epard et al. | |
| 5,315,711 A | * | 5/1994 | Barone et al. | 708/208 |
| 5,341,477 A | * | 8/1994 | Pitkin et al. | 709/226 |
| 5,581,390 A | * | 12/1996 | Fielden et al. | 359/158 |
| 5,675,828 A | * | 10/1997 | Stoel et al. | 463/25 |
| 5,692,126 A | * | 11/1997 | Templeton et al. | 395/200.79 |
| 5,909,545 A | * | 6/1999 | Frese et al. | 709/208 |
| 5,913,920 A | * | 6/1999 | Adams et al. | 709/204 |
| 5,968,129 A | * | 10/1999 | Dillon et al. | 709/223 |

OTHER PUBLICATIONS

Van Hoff, et al., Hooked on Java, p.8, Jan. 1996.*
Van Hoff, et al. Hooked on Java, p. 8, Jan. 1996.*
Clark et al. "DAWGS—A distributed compute server utilizing idle workstations", Proc of the 5th Distributed Memory Computing Conf., IEEE pp732-741, Apr. 1990.*

(Continued)

*Primary Examiner*—Dung C. Dinh

(57) ABSTRACT

A cluster computer system including multiple network accessible computers that are each coupled to a network. The network accessible computers implement host computer programs which permits the network accessible computers to operate as host computers for client computers also connected to the network, such that input devices of the client computers can be used to generate inputs to the host computers, and such that image information generated by the host computers can be viewed by the client computers. The system also includes a cluster administration computer coupled to the multiple network accessible computers to monitor the operation of the network accessible computers. A method for providing access to host computers by client computers over a computer network includes receiving a request for a host computer coupled to a computer network from a client computer coupled to the computer network, wherein the relationship of the host computer to the client computer is to be such that after the client computer becomes associated with a host computer, an input device of the client computer can be used to generate inputs to the host computer, and such that image information generated by the host computer can be viewed by the client computer. Next, a suitable host computer for the client computer is determined, and the client computer is informed of the network address of the suitable host computer.

14 Claims, 25 Drawing Sheets

OTHER PUBLICATIONS

"More Data at Twice the Speed," San Jose Mercury News, Friday, Mar. 1, 1996, pp. 2c.

"Farallon Netopia Virtual Office," Netguide, Jun. 1997, pp. 24.

"Farallon to Add Scripting Hooks to Timbuktu 4", MacWeek, Jun. 9, 1997, pp. 7.

Gianturco, Michael, "Souped-Up Windows," Forbes, Jul. 29, 1996, pp. 88.

Staten, James, "Windows Apps via the Internet," Mac Week, Jul. 22, 1996, pp. 14.

Petreley, Nicholas, "Broadway Debut Could Upstage Web-Based Trio Java, Active X, OpenDoc," RCVD Jul. 21, 1997.

"Software Will Run Windows Through Web Browsers," San Jose Mercury News, Jan. 27, 1997, pp. 4e.

"Microsoft Pursues Multiuser NT," IW Mar. 3, 1997, pp. 28.

Robinson, Phillip, "Unwired Net," San Jose Mercury News, Jun. 8, 1997, pp. 4e.

Hutheesing, Nikhil, "Airship Internet," Forbes, Mar. 5, 1997, pp. 170-171.

Cook, William J., "1997 A New Space Odyssey," U.S. News & World Report, Mar. 3, 1997, pp. 44-48, & 52.

Markoff, John, "Mercedes Puts Internet in Car," San Jose Mercury News, Apr. 29, 1997, pp. 1a & 4a.

"Commercial Satellites Launch 'unwired planet'," San Jose Mercury News, May 18, 1997, pp. 1e.

"The Satellite Biz Blasts Off," Business Week, Jan. 27, 1997, pp. 62-63, 65-66, 68 & 70.

Hardy, Quentin, "Iridium Phone Project Maps an Upscale Orbit," The Wall Street Journal, Jan. 10, 1997, pp. B16.

* cited by examiner

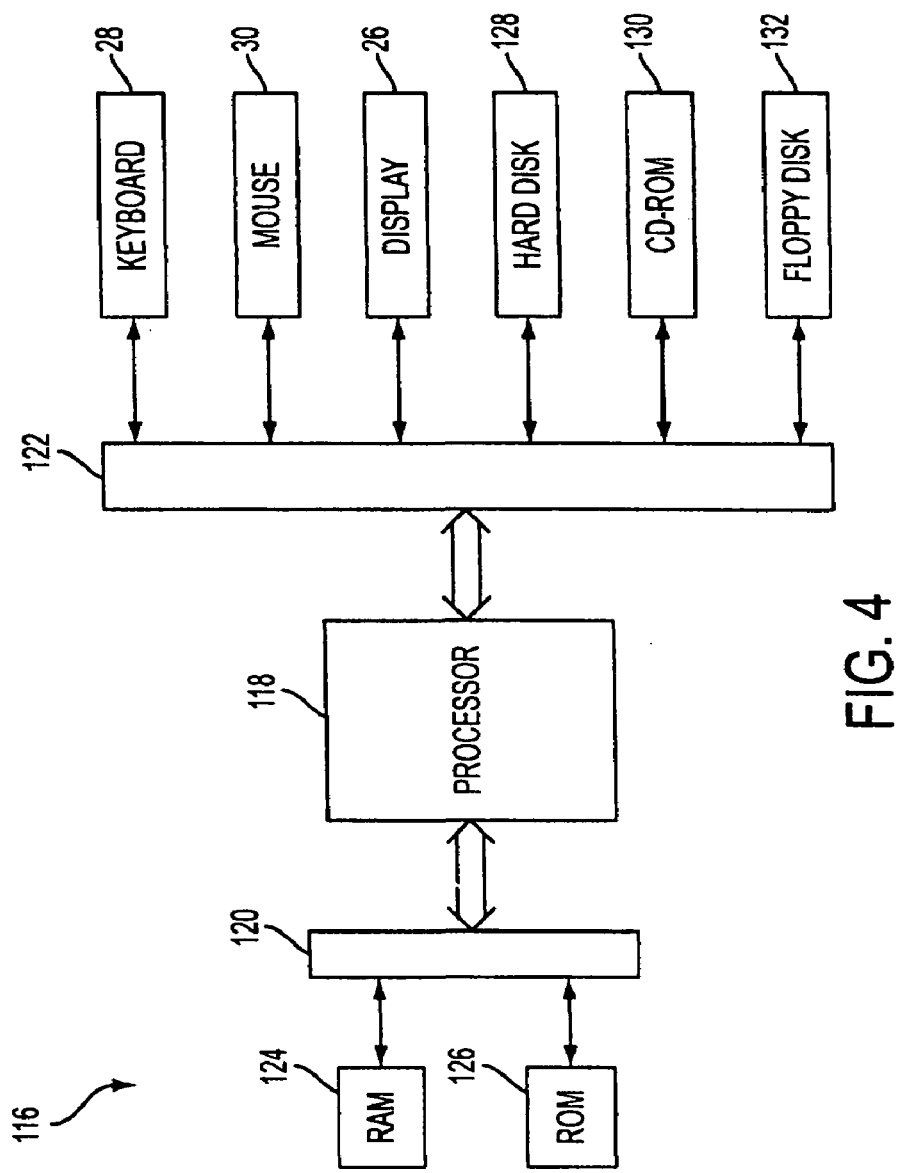

METHOD AND APPARATUS FOR COMPUTING OVER A WIDE AREA NETWORK

CROSS REFERENCE TO RELATED APPLICATIONS

This application claims the benefit of U.S. Provisional Patent Application No. 60/012,905, entitled Method and Apparatus for Computing Within a Wide Area Network, filed Mar. 6, 1996 on behalf of Paul L. Hickman and Michael L. Gough, the disclosure of which is incorporated herein by reference.

This application is a Continuation-in-Part of U.S. patent application Ser. No. 08/799,781 filed on Feb. 12, 1997 on behalf of Paul L. Hickman, entitled "Method and Apparatus for Computing Over a Wide Area Network", the disclosure of which is incorporated herein by reference.

This application is related to copending U.S. patent application Ser. No. 08/799/787 entitled Method and Apparatus for Computing Within a Wide Area Network of Paul L. Hickman and Michael L. Gough, filed on an even day herewith and owned in common with the present application, and incorporated herein by reference.

TECHNICAL FIELD

This invention relates generally to networks of computer systems, and more particularly to wide area networks such as the Internet and the World Wide Web as supported by the Internet.

BACKGROUND ART

The Internet has, of late, become extremely popular. The origins of the Internet date back several decades to a U.S. government sponsored military/educational/business wide area network (WAN) that was designed to remain operational even in the event of the catastrophe, e.g. a major earthquake or a nuclear war. To accomplish this goal, robust protocols and systems were developed which allowed a non-hierarchical, geographically distributed collection of computer systems to be connected as a WAN such that the loss of a particular computer, or group of computers, would not preclude the continued communication among the remaining computers.

Each computer or "node" on the Internet can support one or more "entities" or "domains." These entities are addressed on the Internet with a domain name which uniquely identifies the domain. Individual users within a domain are provided with names unique to that domain. For example, to communicate with John Smith at a domain "hacksoft.com", electronic mail or "e-mail" could be sent, for example, to john_smith@hacksoft.com. The suffix "com" means that the domain belongs to a commercial entity (e.g. a business), the suffix "gov" means that the domain belongs to a government entity, and the suffix "edu" means that the domain belongs to an educational entity (such as a University). Other suffixes are available, e.g. for specific foreign countries, for networks ("net"), etc. These suffixes are referred to as "first level" domain names, while the penultimate names (such as "hacksoft") are referred to as "second level" domain names.

While the use of the Internet has been prevalent for many years now, its use has been limited by the arcane and difficult commands required to access the various computers on the network. To address this problem, a protocol known as the "World Wide Web" or "WWW" was developed to provide an easier and more user-friendly interface for the Internet.

With the World Wide Web an entity having a domain name creates a "web page" which provides information and, to a limited degree, some interaction with the entity's "web site." By convention, Web pages are written in "hyper-text mark-up language", commonly referred to as "HTML." An address for a Web page site for a hypothetical company "Hacksoft" could be http//:www.hacksoft.com. The "http" is a prefix identifying the protocol, namely "hyper-text transfer protocol," the "www" refers to the World Wide Web, "hacksoft" is the "second level" domain name, and "com" is the "first level" domain name that specifies a commercial enterprise. The full address for the Web page site, namely "http//:www.hacksoft.com", is known as the address or "URL" of the home page of the Web site.

A computer user can "browse", i.e. navigate around, the WWW by utilizing a suitable web browser and an Internet service provider. For example, UUNET, America Online, and Global Village all provide Internet access. Currently, the most popular web browser is made by Netscape of Mountain View, Calif. The web browser allows a user to specify or search for a web page on the WWW, and then retrieves and displays the desired web page on the user's computer screen.

When a computer user "calls up" a web page, a variety of information may be displayed on the screen as determined by the entity maintaining the web site. HTML supports text and graphics, and permits "hyperlinks" that allow visitors to the web site to "jump" to (i.e. access and display) other web pages on the WWW. Therefore a person cruising the web may start on a web page of, for example, a company in Palo Alto, Calif., "click" on a hyperlink, and be connected to a web page of, for example, a University in the Netherlands. Clicking on a hyperlink on the on the Dutch University's web page may cause the user to be connected to a web page of, for example, a Government agency in Japan. In this fashion, the World Wide Web can be navigated and browsed for information in an intuitive, linked, and easy to use fashion, and information on computers from around the world may be accessed easily and intuitively.

Until recently, the World Wide Web was, essentially, primarily passive provider of information. There was some limited interactivity in that a computer user could leave certain information at a web site such as their name, address, phone number, etc. which could then be responded to by the entity maintaining the web site. Very recently, there as been an expansion of computational interaction over the World Wide Web. A system known as "Java™" developed by Sun Microsystems, Inc. of Mountain View, Calif. permits programs known as "Applets" to be transferred over the Internet, and run on a user's computer, regardless of the local machine's operating system or hardware. Java Applets are thus operating system and hardware independent. With Java software, a web page can be used to download an Applet to run on a computer user's machine. Typically, these Applets are small programs designed for a specific task, e.g. to create a graph, animate a display, or provide a spreadsheet. After the Applet software serves its function it is typically discarded, i.e. it is usually not permanently saved.

Before Java software, the World Wide Web resembled a large collection of hard disk drives which stored data retrievable by Internet users. With the advent of Java software, the World Wide Web is, in a limited fashion, gaining computational powers.

While Java software is a major advance in the functionality of the Internet, it still falls short of providing true computational power on the World Wide Web. Applets are small, typically transient programs designed for specific tasks. However, it is contemplated that it would be desirable to have a fully functioning computer system, such as a personal computer (PC), a workstation, a mini computer, a mainframe, or even a supercomputer that could provide vastly greater power and functionality to users of the World Wide Web. In addition, the presence of the computational power of larger systems on the Web would also provide for enhanced communication and functionality on the WWW, and would provide access to software applications that could not be implemented, in a practical manner, with an Applet.

There currently exists a species of software which permits a first computer ("master computer") to monitor and/or control the functionality of a second computer (slave computer). For example, the programs "Timbuktu" and "Carbon Copy" permit a master computer to control a slave computer, or to simply monitor the activity of the slave computer. The owner of the "Timbuktu" software, Farallon Computing, Inc. of Alameda, Calif. has obtained a U.S. Pat. No. 5,241,625 entitled "Screen Image Sharing Among Heterogeneous Computers", the disclosure of which is incorporated herein by reference. More specifically, these prior art software products provide a methodology which allows the screen of a master computer to display an image of the screen of a slave computer. Optionally, the keyboard and mouse of the master computer can provide inputs to (and thereby control) the slave computer as well.

As communication over wide area networks, such as the Internet, becomes faster, it becomes practical to distribute certain functionality across the network. For example, in an article entitled "More Data at Twice the Speed", San Jose Mercury News, page C1, Mar. 1, 1996, it was reported that three separate research teams designed a system for transmitting one trillion bits of information per second (a "terabit"). The three teams were Fujitsu Laboratories, AT&T/Bell Labs, and the Japanese communications conglomerate, NTT. This data rate, corresponding to the transmission of one thousand copies of a 30-volume encyclopedia in a single second, permits the practical storage of data at sites remote from a user. For example, Charles Brackett, Executive Director of Optical Networking Research at Bell Communication Research in New Jersey, indicated, in the aforementioned article, that: "This will create huge changes in corporate America. . . . Once we get that kind of capacity in the field, you might just as well have your database in California if you are a bank in New York, as have it next door. Data will move that fast between the two."

While the prior art has contemplated the remote storage and retrieval of data, it has not addressed the concept of distributing computational power on a wide area network such as the Internet, in such a fashion that maximizes efficiencies and reduces costs. The standard model for interacting with the Internet is still a costly stand-alone personal computer. While there has been some discussion of a low cost "Internet box", such devices have heretofore been considered low-power "appliances" capable of only simple tasks, and primarily dedicated to "browsing" the WWW. Such "Internet boxes" have not heretofore been thought of as replacements for costly, stand-alone personal computers.

DISCLOSURE OF THE INVENTION

The present invention permits virtually the entire functionality of a computer system to be made accessible to a wide area network such as the Internet. More particularly, the present invention permits a computer system to be run as a "virtual machine" through a web page provided at a web site on the World Wide Web (WWW). This permits the computing functionality to be distributed across a wide area network, such as the Internet.

The apparatus of the present invention includes a number of computers arranged in a wide area network (WAN) such as the Internet. At least one of the computers has at least one unique address designating a web site. A host computer system (which may or may not be one of the computers on the Internet) can be "posted" onto an "advertising" web page at the web site to permit other computers coupled to the Internet to interact directly with the host computer system. The computer "posted" on the web page is referred to as the "host" or "advertiser" computer, and computers accessing the host computer are referred to as "client" or "user" computers. Having the host computer posted on a web page creates a "virtual computer" that can be view and/or controlled by the client computers. Once the connection has been made between the host computer and one or more client computers, the web page is bypassed, i.e. the two or more computer systems communicate through the Internet without necessarily going through the web site supporting the "advertising" web page.

A client computer (which may or may not be one of the computers on the Internet) can interact with a host computer via the Internet in varieties of ways. For example, the client computer can be used to simply monitor the screen of the host computer. Alternatively, the client computer can be used to both monitor the screen of the host computer and to provide inputs to the host computer via a keyboard, mouse, or other input device. This, in certain circumstances, allows the client computer to control the functionality of the host computer. For example, the client computer can run a program on the host computer which provides the client computer with the aforementioned "virtual machine" on the Internet with computational powers that can be far greater than that provided, for example, by Java Applets. Also, the client computer can merely provide inputs to the host computer, without visual feedback, such as in a "blind bid" arrangement.

The present invention also allows a multiplicity of client computers to access the "virtual machine" via the Internet. This, in effect, allows multiple computer users to control a single host computer at a remote site. This can be very useful for collaborative activities performed over the Internet. Alternatively, a multi-tasking operating system on a host computer (such as Windows NT™ from Microsoft Corporation) would allow each window to be a "virtual machine" for one or more client computers.

The present invention also provides a method and system for providing distributed computing power within a wide area network. More particularly, computing power can be provided by "clusters" of computers coupled to the Internet. These clusters each include a cluster administration computer (CAC), and one or more network-accessible computers (NACs). Both the cluster administration computer and the network-accessible computers are preferably coupled to the Internet. The network-accessible computers share mass storage (such as a large disk drive or an array of large disk drives), and are monitored by the CAC to ensure that they are operating properly. If the CAC detects a malfunctioning in one of the NACs, that NAC can be re-booted and re-initialized to bring it back "online." Alternatively, the cluster can be reduced to a single network-accessible computer (without a CAC), which is coupled to the Internet to be used as a virtual machine by others.

With a network-accessible computer and/or a "cluster" of network-accessible computers, great computational and storage efficiencies are obtained. For example, since a typical stand-alone personal computer is only used a few hours of the day, by having network-accessible computers on the WWW it is possible to reduce the total number of computers required to service the many individual users. For example, computers that would normally be idle in one time zone can be used by users in another time zone. Furthermore, the cost per computer that is part of a cluster will be less than that of comparable stand-alone personal computers since certain common resources, such as mass storage, power supplies, modems, etc., can be shared among the computers of the cluster.

Since it is desirable for users to have the same type of experience with a network-accessible computer as with their own personal computer, there is the provision for the storage of "personal states" on the Internet. The personal states store, as a minimum, a user's data and/or other files so that they can access them from anywhere on the Internet. In addition, the personal state preferably also includes the "states" of the computers that they last used so that when they access a network-accessible computer of the same type in the future, it would appear just as they left it. For example, when a user accesses a Macintosh NAC on the Internet, the personal state for the last use of a Macintosh is retrieved so that the file structure, folders, and even the states of the registers in the CPU would be the same as the last time they used a Macintosh NAC.

It should be noted that a "user" within the context of the present invention need not be a human being. For example, a user of the present invention can be a software program which "lives on" or is inserted onto the Internet. This "virtual person" can inhabit NACs and use other service of the Internet up to its ability to pay for those services. For example, there can be a "handyman" virtual person that lives on a NAC and which advertises its services on the WWW of, for example, maintaining hard disk drives, monitoring the Internet for information pertinent to a human or another virtual user, etc. Human users or other "virtual users" can pay (via a credit transfer) the virtual person for providing these services, such that the virtual person begins to accumulate wealth. This wealth can be used to pay for the NAC home for the virtual user, can be used as capital for increasing the virtual user's business, can be used to upgrade the "home" of the NAC as it moves to ever more powerful NACs on the network, can provide start-up capital for the virtual user to create "offspring" on the Internet, and, very likely, can transfer this wealth to the creators of the virtual user or their designees.

It should be noted that the methods and apparatus of the present invention are primarily discussed with reference to the Internet or the WWW. It should be appreciated that these same methods and apparatus can be extended to smaller or "local area networks" (LANS) as well. For example, many companies have created "Intranets", i.e. private networks subscribing to the Internet's TCP/IP protocol and capable of supporting web page structures. The present invention is equally applicable to such smaller networks as well.

An advantage of the present invention is that much greater computational power is accessible by users of the Internet and the WWW. The present invention will, for example, allow a client computer user to diagnose and fix problems on a host computer, run application programs that are available on the host computer, perform maintenance on the host computer, etc. Furthermore, users from multiple client computers can access a single host machine to permit collaborative or multiple individual efforts on that computer system.

A further advantage of this invention is that computing power can be distributed widely over the Internet to increase computational efficiency and functionality, and to reduce overall costs. Since a simple Internet access computer can be used to control a computer of any desired power or functionality, the need for the stand-alone personal computer is much diminished. Also, since the computing power can be shared among a number of users, the cost per user is greatly reduced. For example, if a user uses his personal computer only about 20% of the time, he can experience great cost savings by sharing computers on the Internet with other users.

Yet another advantage of the present invention is that "virtual users" (sometimes referred to as "intelligent agents" or "robots") can be supported by the Internet to permit robotic type work to be performed for the ultimate benefit of human users. These virtual users can operate autonomously, can generate wealth, can reproduce, and can work in concert with or for other virtual users.

These and other advantages of the present invention will become apparent upon reading the following detailed descriptions and studying the various figures of the drawings.

BRIEF DESCRIPTION OF THE DRAWINGS

FIG. 4 is a block-diagram of an exemplary computer system in accordance with the present invention;

BEST MODES FOR CARRYING OUT THE INVENTION

Figure 1:
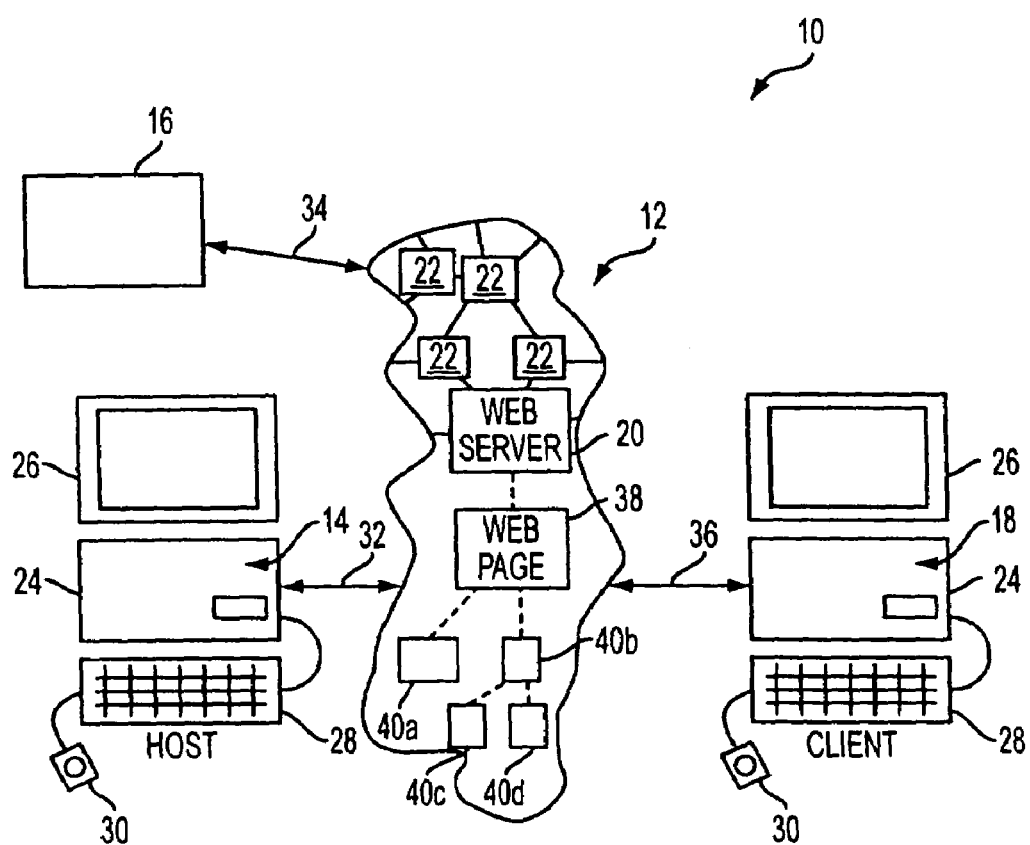
FIG. 1 is an illustration of an apparatus of the present invention.

In FIG. 1, a system 10 for controlling a computer over a wide area network such as the Internet 12 includes a number of computer systems, such as computer systems ("machines") 14, 16, and 18, that are coupled to the Internet 12. By implementing the processes, apparatus, and systems of the present invention, one or more of the computer systems 14–18 can monitor and/or access virtually the entire functionality of any other computers 14–18 connected to the Internet 12. It should also be noted that, for the most part, any reference to the Internet also would apply to a private Intranet that uses the Internet's TCP/IP protocols.

It should be noted that the semantics used herein can have multiple meanings. Looked at in one way, the machines 14, 16, and 18 are outside of the Internet 12 and communicate with the Internet by communication links. Looked at in another way, when the machines 14, 16, and 18 become a part of the Internet 12, i.e. the bubble surrounding the Internet 12 expands to include these machines. However, for the purpose of the present descriptions, a machine (e.g. a computer system such as a router, switch, or general purpose computer system) will be considered to be part of the Internet 12 if it examines and passes packets intended for other machines, and otherwise will be considered to be merely connected to the Internet.

While the preferred wide area network of the present invention is the well-known Internet, it should be noted that other network systems capable of supporting the processes and apparatus of the present invention can also be utilized as an intermediary area between one or more computer systems 14–18. For example, other WANS such as cabled WANS (both private and public), wireless WANS, fiber-optic WANS etc. can also practice the present invention with suitable modifications to the base processes that would be apparent to those skilled in the art. Further, as is well known to those skilled in the art, the Internet is only one instance of a network using "TCP/IP" data packet transmission protocols. For example, private "Intranets" using TCP/IP protocols are essentially privately operated equivalents of the publicly accessible Internet. The construction and use of TCP/IP protocol networks such as the Internet and private Intranets, and the TCP/IP protocol data packets (or simply "TCP/IP data packets") sent over such networks, is well known to those skilled in the art.

As noted previously, the origins of the Internet dates back several decades to a U.S. government sponsored military/education/business wide area network designed to survive the worst of catastrophes. The Internet includes a large number of linked computer systems, which will be referred herein as "web servers" such as a specified web server 20 and many other interconnected web servers 22.

In FIG. 1, web server 20 is shown to be "within" the Internet 12, i.e. it is connected as a node within the Internet as defined above. The architecture and operation of the Internet are well-known to those skilled in the art. For a description of the Internet and of the World Wide Web ("WWW") supported by the Internet, see *HTML Publishing on the Internet*, Kenny Chu and Francis Chin, McGraw Hill, 1996, the disclosure of which is incorporated herein by reference.

Each of the computer systems 14–18 typically include a processor unit 24, a video display ("monitor" or "screen") 26, a keyboard 28, and a "pointing" device such as a mouse 30. Computer systems such as computer systems 14–18 are well-known and are commercially available from a variety of manufacturers. In the following descriptions, the computer systems are described primarily in terms of Macintosh computer systems, although it will be appreciated by those skilled in the art that Microsoft Windows/Intel Microprocessor ("WINTEL") compatible computer systems, SUN and HP workstations, etc. can provide equivalent of functionality.

The computer systems 14, 16, and 18 can be coupled to the Internet 12 (and can be considered to become a part thereof) in a variety of fashions. These Internet connections are shown generically at 32, 34, and 36, respectively. For example, the computer system 14 may be connected to a web server 20 or 22 on the Internet 12 with a modem and telephone line, a digital connection such as an ISDN telephone line, through the intermediary of a local area network (LAN), etc. Methods and apparatus for coupling computer systems such as computer systems 14–18 to the Internet are well-known to those skilled in the art.

The various "web servers" on the Internet are simply computer systems of any type which conform to the well-known Internet communication protocols. These web servers have a tremendous variations in computing power, ranging from personal computers to mainframe computers. These web servers often include monitors, keyboards, mice, etc. However, the web servers 20 and 22 can simply be a "box" on the Internet 12 with limited or no local input or output capabilities.

As it is well-known to those skilled in the art, the Internet 12 can be accessed by computers 14–18 using a number of protocols. One of the easiest and most popular user interfaces is known as the World Wide Web (WWW) which is described, inter alia, in *HTML Publishing on the Internet*, supra. With the WWW, a web server 20 can support one or more "web pages," such as web pages 38, 40a, 40b, 40c, and 40d. A web page is a software constructed "object" including an interface written in HTML which permits text and images to be presented to a computer system that is coupled to or part of the Internet 12. A web page can include "hyperlinks" to other web pages, both on its local web server 20 and throughout the Internet 12. A "web site" on a web server 20 contains one or more web pages where a "base" or "home" page is the first or entry page into a desired web site. For example, the home page illustrated in FIG. 1 is the web page 38 which is linked via hyperlinks to additional web pages 40a–40d.

The method and apparatus of the present invention permits computer systems ("clients" or "users") to monitor or control the functionality of other computer systems ("hosts" or "advertisers") connected to the Internet 12 (such as computers 14–18), or which are a part of the Internet 12 (such as the web servers 20 and 22 which support "web pages"). As described herein, the "host" or "advertiser" machine becomes a "virtual machine" on the Internet 12 which can be accessed by the "client" or "user" machine. It should be noted that on the client or user side that any computer or machine ("platform") will be able to subscribe to a virtual machine, provided by any host platform. Thus, seemingly incompatible hardware could be used in concert; e.g. a WINTEL machine can be used as a client for a Macintosh host machine. In addition to providing great computational power through the Internet 12, the posting of a "virtual machine" on the Internet permits the client machine to be relatively low powered, i.e. an inexpensive computer system having a less powerful microprocessor, less memory, fewer peripherals etc. than the "virtual machine" provided by the host computer system.

As will be discussed in greater detail subsequently, and by way of example, the method and apparatus of the present invention permits a client computer system 18 to take over the functionality of a host computer system 14 such that the keyboard 28 and mouse 30 of computer system 18 provides inputs to the computer system 14, and such that images on the monitor of computer system 14 are replicated on the monitor 26 of the computer system 18. In this way, a "virtual machine" appears to be running on the monitor 26 of the client machine. In reality, the processing power and resources of the host system 14 are providing the "virtual machine" for the client computer system 18.

It should be noted that other inputs and outputs of the host machine 14 can also be sent and received by the client computer 18. For example, sounds generated by the computer system 14 can be "played" through the Internet 12 on computer system 18, while other inputs to computer system 18 (such as inputs from a tablet, not shown) can be transmitted for processing by the computer system 14. The capturing of outputs such as sounds and their transmission over the Internet is well known to those skilled in the art. Likewise, the transmission of other data representing inputs over the Internet would be well within the scope of those skilled in the art.

Figure 2:
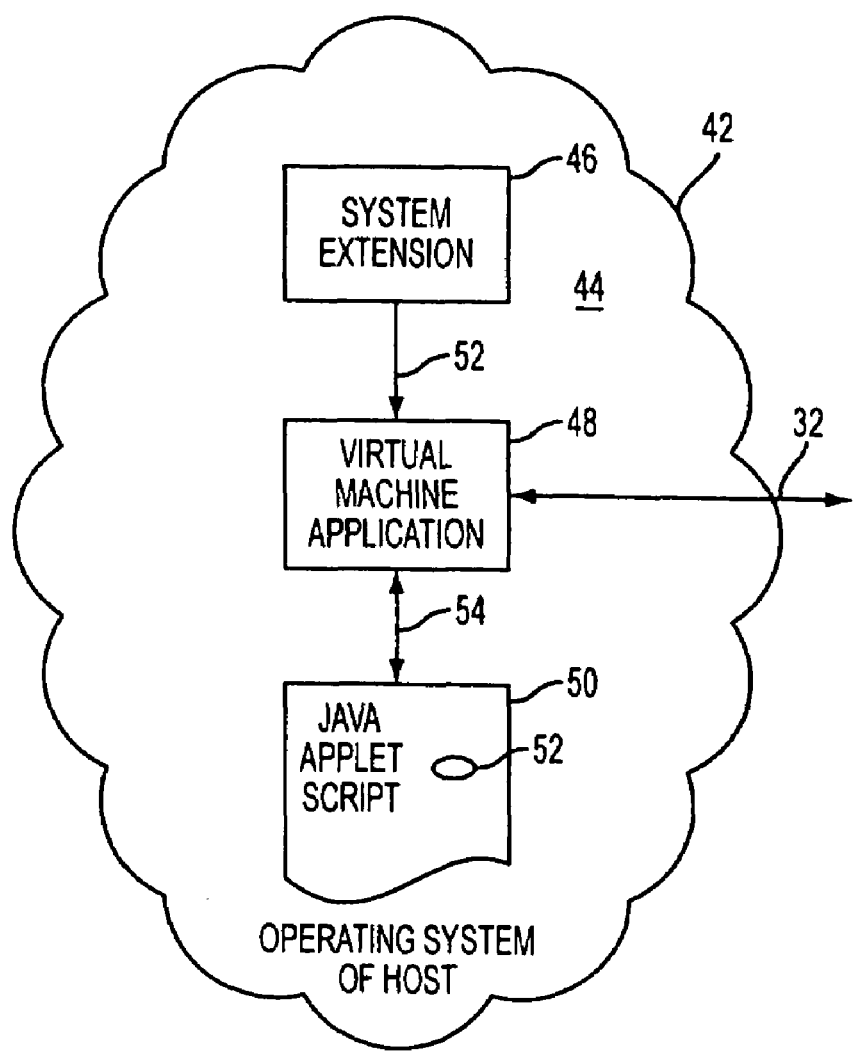
FIG. 2 is an illustration of the processes running on a host computer system of FIG. 1.

FIG. 2 illustrates a process 42 that can run on a host computer system, such as computer system 14. In a preferred embodiment of the present invention, the process 42 can originate entirely from a "host machine" i.e. from a host computer such as computer system 14. In other embodiments of the present invention, processes of the present invention may be distributed over the Internet to, for example, the web server 20 or to a client machine, such as on computer system 18.

In the process 42 of FIG. 2, an operating system 44 of the host supports a "system extension" 46, a virtual machine application 48, and a Java Applet script 50. The virtual machine application communicates with or becomes part of the Internet 12 over the link 32 as described previously. Java is commercially available, as is well known to those skilled in the art. The creator of Java software is Sun Microsystems of Mountain View, Calif., who makes Java software and various Java software utilities commercially available. Microsoft Corporation of Redmond, Wash. also has a commercially available version of Java software known as J++software which implements standard Java software with additional support for Microsoft's ActiveX software.

The system extension 46 is also known, in the Macintosh world, as an "init."The system extension 46 is patched into the operating system 44 of the host computer system at system boot-time ("during power-up"). As such, the system extension 46 becomes part of the operating system of the host and "patches", "modifies, and "enhances" the functionality of the operating system. The purpose of the system extension 46 and the process 42 of the present invention will be discussed in greater detail subsequently.

The virtual machine application 48 is a computer program or "process" running from a host computer system, such as computer system 14. A virtual machine application is therefore started in a standard fashion to other application programs running on personal computer systems. For example, a computer system using a graphical user interface ("GUI"), an application program may be started (sometimes referred to as "executed", "evoked", "launched" etc.) by selecting and activating an icon representing the application program with a pointer controlled by an input device such as a mouse. Alternatively, the virtual machine application can be started by a number of other conventional techniques, such as with a selection from a pull-down menu, the entry of the name of the program on a command line, by a use of an alias, etc. The virtual machine application receives information from a system extension 46 as indicated by the arrow 52 and communicates with the Internet 12 via the communication link 32.

The Java Applet script 50 is a piece of "dead code" on the host computer system, i.e. it is not executed on the host computer system. Embedded in the Java Applet script is the Internet address 52 of the host machine. The virtual machine application 48 is preferably capable of changing the Java Applet script in that it can modify the script based on a number of criteria, and can also send the Applet onto the Internet 12 via the link 32. The virtual machine application 48 stores the address of the client computer for this purpose in the memory of the host machine. The virtual machine application 48 and the Java Applet script 50 interact as indicated at 54.

In other words, the virtual machine application 48 preferably generates a Java Applet script 50 by embedding the Internet address of the host machine as a constant in an existing Java Applet script 50 which has an undefined value for the Internet address. The completed Java Applet script 50 executes on the client machine and is described with reference to FIG. 11. Since the script is transmitted over the TCP/IP network from the host machine (or, alternatively, by another server on the Internet 12) to the client machine for execution, the script (in this example a Java Applet script) will be referred to generically as a "client program" that is "delivered" via the TCP/IP network. The virtual machine application 48 can send the Java Applet script 50 onto the Internet 12 via the link 32.

Figure 3:
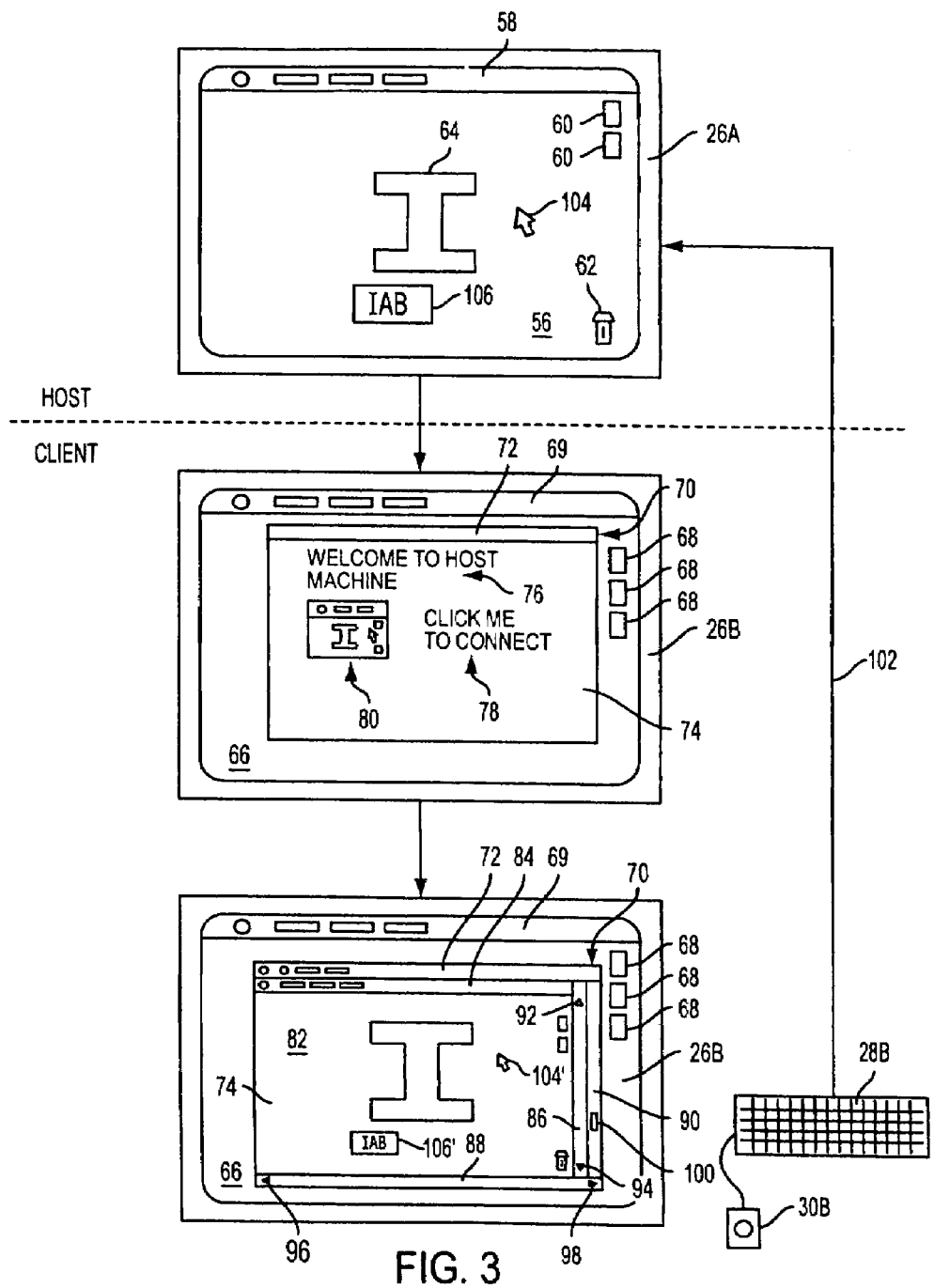
FIG. 3 is an illustration of the screen of a host computer and corresponding screens of a client computer of the system of FIG. 1.

In FIG. 3, a monitor 26a of a host computer (such as a host computer system 16) and the monitor 26b of a client computer (such as client computer 18) are illustrated. The host computer monitor 26a includes a screen 56 displaying a number of images. More particularly, the screen 56 displays a menu bar 58, a number of icons 60 and 62, and one or more images 64. A monitor 26b of the client includes a screen 66 that can include a number of icons 68, a pull-down menu bar 69, and a "browser" window 70. The browser window is generated by a suitable browser program that permits the navigation of web pages over a TCP/IP network such as the Internet or an Intranet. An acceptable browser of the present invention is the popular Netscape™ browser made by Netscape, Inc. of Mountain View, Calif. having built-in Java capabilities.

The window 70 created by the browser includes a menu bar 72 and a page display area 74. In this instance, the display area 74 shows the "home page" created by a host machine, such as computer system 14. The home page 74 includes a greeting 76, instructions 78, and an icon 80. This icon 80 can be any suitable icon, such as a picture of a computer, or it can display the actual image displayed on the screen 56 of the host computer monitor 26a. In the latter instance, the icon 80 can be static or dynamic, i.e. the image displayed by the icon 80 can be a "snap shot" of the display on screen 56 at a particular point in time, or it can be dynamically updated to show changes in real time being made to the display of the monitor 26a.

At the bottom of FIG. 3, the monitor 26b shows the screen 66, icon 68, and pull-down menu bar 69 of the client computer system. Shown displayed on the screen 68 is the web browser window 70 having the menu bar 72. However, within the web browser 70 window area 74 is the image of the screen 56 of the host computer forming a "virtual computer" window 82. The virtual computer window 82 includes a pull-down menu bar 84, a vertical pan bar 86, a horizontal pan bar 88, and a zoom bar 90.

The image within the virtual window 82 is at least a portion of the image displayed on the host computer monitor 26a. However, due to space and resolution limitations, the virtual computer window 82 may not be large enough or have a high enough resolution to show the entire image on the screen 56 of the host computer monitor 26a. For this reason, the vertical pan 86 includes scroll buttons 92 and 94 to allow an up and down vertical scrolling ("vertical panning") of the image displayed in the virtual computer window 82, the horizontal scroll bar 88 includes left and right scrolling buttons 96 and 98, respectively, to permit a left and right lateral scrolling ("lateral panning"), and a sliding zoom control 100 permits a zooming in and zooming out of the image displayed within the virtual machine window 82 to accommodate more and less of the image displayed on the screen 56 of the host machine 26a. It should be therefore noted that the method and apparatus of the present invention permits a "translation" of resolutions between the host computer and the client computer.

It will be apparent from the diagram of FIG. 3 that the image on the screen of the host computer 26a can be viewed within the virtual machine window 82 of the client machine monitor 26b. In addition, computer inputs from the client keyboard 28b and the client mouse 30b are coupled as indicated by the arrow 102 to the host computer to control the functionality of the host computer. Therefore, by way of example, movement of the client computer mouse 30b can control the position of a pointer 104 on the screen 56 of the host computer 26a. Also typing on the keyboard 28b of the client computer can, for example, input alpha-numeric characters into a window 106 of the host computer. Of course, such inputs will results within the virtual machine window of the client computer, i.e. the display pointer 104' will move and characters will appear within a window 106' within the virtual machine window 82 of the client computer.

It will be noted that the present invention makes use of the Java programming language provided by Sun Microsystems, Inc. of Mountain View, Calif. As it will be apparent from the following descriptions, this provides a convenient method for implementing the processes and systems of the present invention from a host computer.

Alternatively, other processes of the present invention will distribute the computational tasks among various web servers 20 and 22 on the Internet 12 and/or distribute computational tasks to a client computer, such as computer system 18. As it is well known to those skilled in the art, the terms "click," "select," and the like refer to the act of using a pointer, such as a mouse 30B, to position a pointer icon, such as a pointer icon 104, on a computer screen, such as computer screen 56, and then activating ("clicking") a button to cause an action at the location pointed to by the pointer icon 104. For example, clicking can press a button, open a file, activate a program, draw a line, etc. By "post" or "posting", it is meant that a computer implemented process is executed which causes a host machine coupled to the Internet to become available as a "virtual machine" on the Internet. The "virtual machine" refers to the fact that a fully functional computer appears to be available in the virtual machine window 82 of the client machine when, in fact, the actual computer can be anywhere on the Internet or can be any computer coupled to the Internet. In this way, the host computer is capable of being "accessed" by the client computer. For example, the virtual machine functionality may be provided by the computer system 14, the computer system 16, the web server 20, or any of the web servers 22 as long as they subscribe and implement the "virtual machine" protocols and processes of the present invention.

Figure 3D:
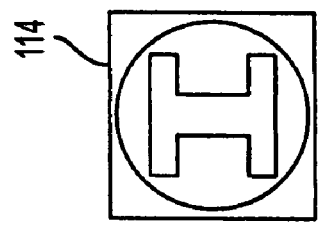
FIGS. 3a–3d illustrate four modes of interaction with the host machine of the system of FIG. 1.
Figure 3C:
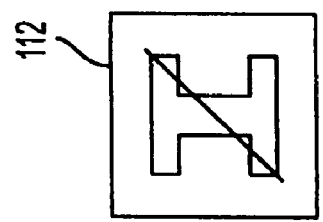
Figure 3B:
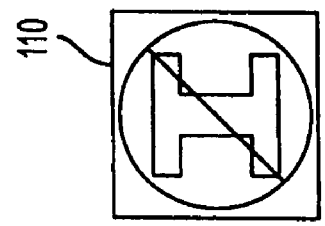
Figure 3A:
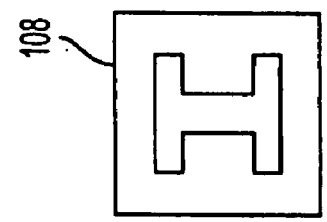

In FIGS. 3a–3d, various icons that can be displayed on the web page 74 for the "virtual machine" implemented by computer system 14 are illustrated. These icons can be used in place of icon 80 of FIG. 3, or in addition to icon 80. Icon 108 of FIG. 3a indicates that the "virtual machine" representing computer system 14 will permit complete input and output access to the computer system 14. The icon 110 of FIG. 3b indicates that no input or output is permitted to the computer system 14. This icon might be present, for example, if computer has already been pre-empted by another user (client) and if collaboration is not permitted. In FIG. 3c, the icon 112 indicates that no output is allowed from computer 14, but that inputs via keyboard, mouse, etc. are permitted. This mode might be permitted in blind bid or posting situations. In FIG. 3d, icon 114 indicates that outputs from the computer system 14 are permitted, but that inputs are not permitted. In the mode illustrated in FIG. 3d, the user of computer system 18 is essentially monitoring ("eavesdropping on") the computer system 14, but is not permitted to modify or influence its operation.

As noted from the above discussion, there are many "computer systems" involved in a wide area network such as the Internet. These computer systems include the computer systems 14–18 and some of the web servers 20 and 22. An exemplary block diagram of a single such computer system is shown in FIG. 4. More particularly, a computer system 116 in accordance with the present invention includes a processor 118, a high speed memory bus 120, and an input/output (I/O) bus 122. The processor 118 is coupled to both the memory bus 120 and the I/O bus 122. Coupled to the memory bus is typically random access memory (RAM) 124 and read only memory (ROM) 126. A number of "peripherals" can be coupled to the I/O bus including the keyboard 28, the mouse 30, the display 26, a hard disk 128, a CD ROM 130, and a floppy disk 132. The storage components of the computer systems are instances of "computer readable media", such as random access memory (RAM) 124, CD ROM 130, and floppy disk 132. Of course, various driver cards and driver protocols ("drivers") may be required for the various peripherals as well as special drives and media as it is well known to those skilled in the art.

Figure 5:
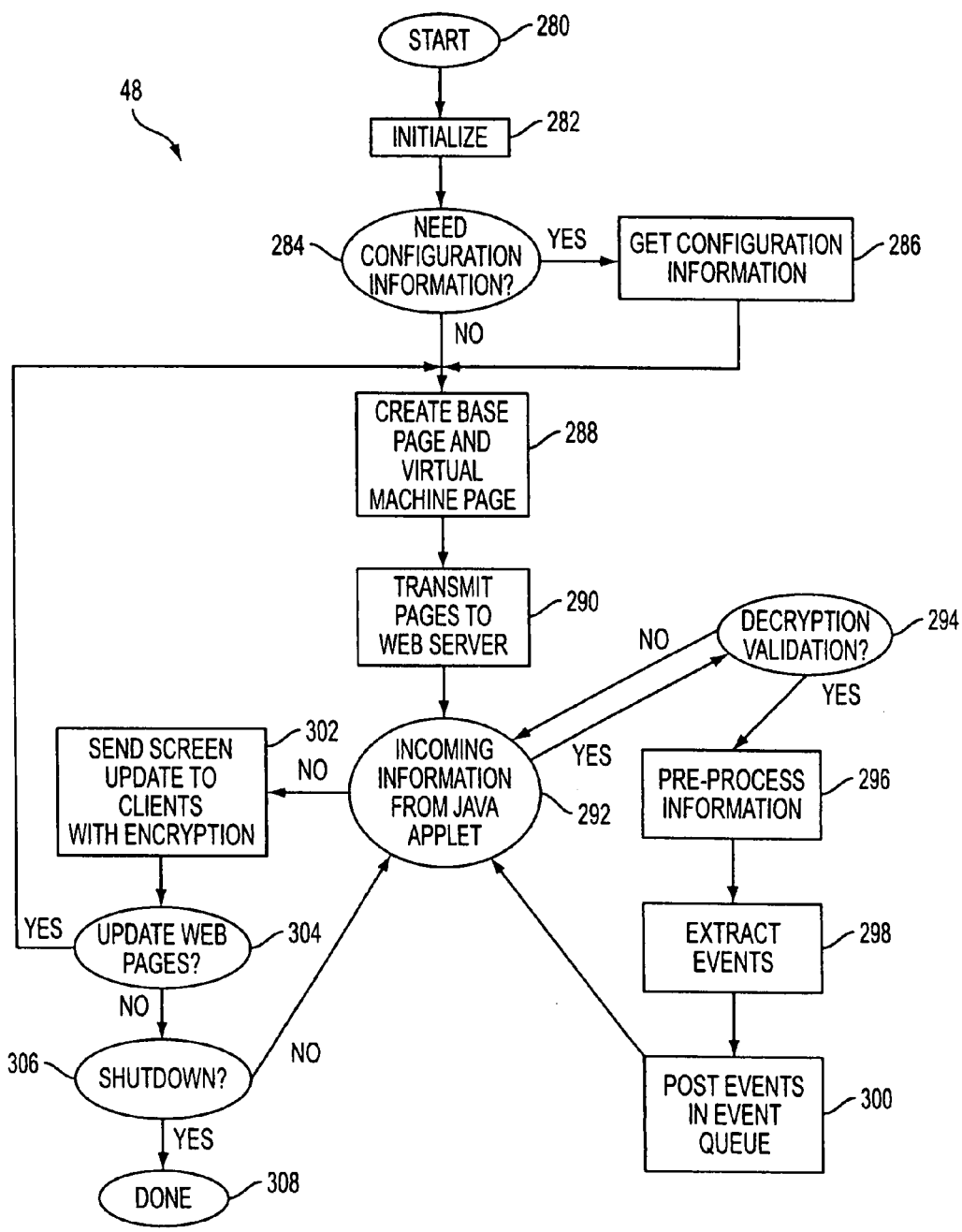
FIG. 5 illustrates the process implemented by the virtual machine application program 48 of FIG. 2.

In FIG. 5, the virtual machine application 48 of FIG. 2 is illustrated in greater detail. This process will also be referred to as the "host program", since it runs on the host. The process 48 is an application program running on the computer system, e.g. on a Macintosh computer system, on a WINTEL computer system, on a workstation, etc. The process 48 begins at 280 and, in a step 282, the application program is initialized; the code of the application is loaded into memory, and internal data structures are initialized. Next, in a step 284, it is determined whether the process 48 needs configuration information. If so, the configuration information is obtained in a step 286. Once the process 48 has the necessary configuration information, a step 288 creates a base page and a virtual machine page. Next, in a step 290, the base page and the virtual machine page are transmitted to the web server 20 over the Internet 12.

The decision step 292 determines whether there is incoming information from a Java Applet. If there is, a decision step 294 determines whether there is a decryption validation. If not, step 294 returns process control to step 292. If there is decryption validation, a step 296 pre-processes the information. A step 298 then extracts the events from the information, and then events are posted into the event queue of the host computer system (such as computer system 14) in a step 300. In this way, a client computer can "control operations" of the host computer as if the keyboard, mouse, etc. of the client computer were directly coupled to the host computer. Of course, keyboards and mice (a "pointing device") are just two instances of input devices producing "input device events."

If there is no incoming information from a Java Applet as determined by step 292, a step 302 will send screen updates to the client with the proper encryption. The screen updates, which may be with or without encryption (depending on the application) contains "image information" that can be used to create an image to be displayed on a monitor of a client machine. A step 304 then determines whether the web pages should be updated, preferably by checking if a fixed period of time has elapsed since the last update. If the web pages are to be updated, process control is returned to step 288 to create new base page and virtual machine pages. If the web pages are not to be updated, a decision step 308 determines whether shut-down of the host computer system is desired. If not, process control is returned to step 292, and if shut-down is desired, the process 48 is complete as indicated at 308.

Figure 6:
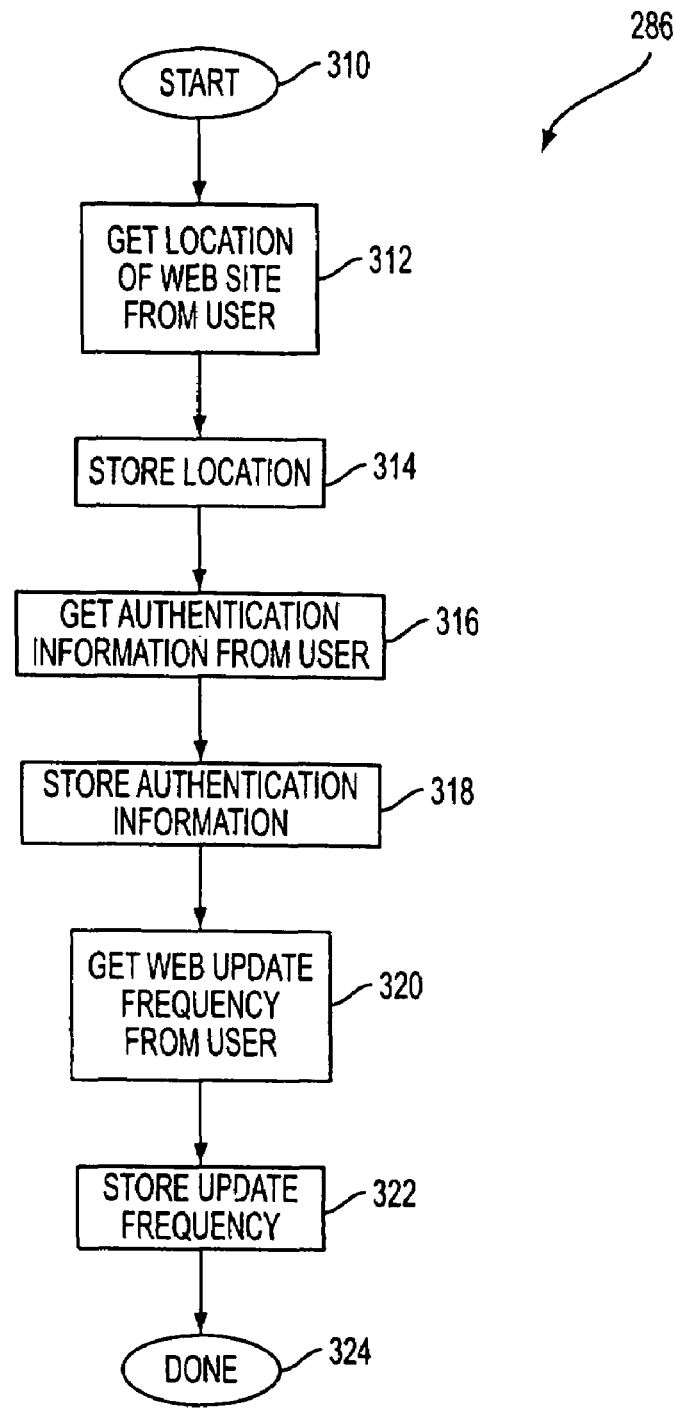
FIG. 6 illustrates the "Get Configuration Information" step 286 of FIG. 5.

In FIG. 6, the process 286 "Get Configuration Information" of FIG. 5 is illustrated in greater detail. Process 286 begins at 310 and, in a step 312, the location of the web site is obtained from the user. This web site location is an address on the World Wide Web that is supported by the web server 20. Next, in a step 314, the location of the web site is stored. A step 316 retrieves authentication information from the user, which is stored in a step 318. Next, in a step 320, the web update frequency is received from the user, and the update frequency is stored in a step 322. The process is then completed at 324.

Figure 7:
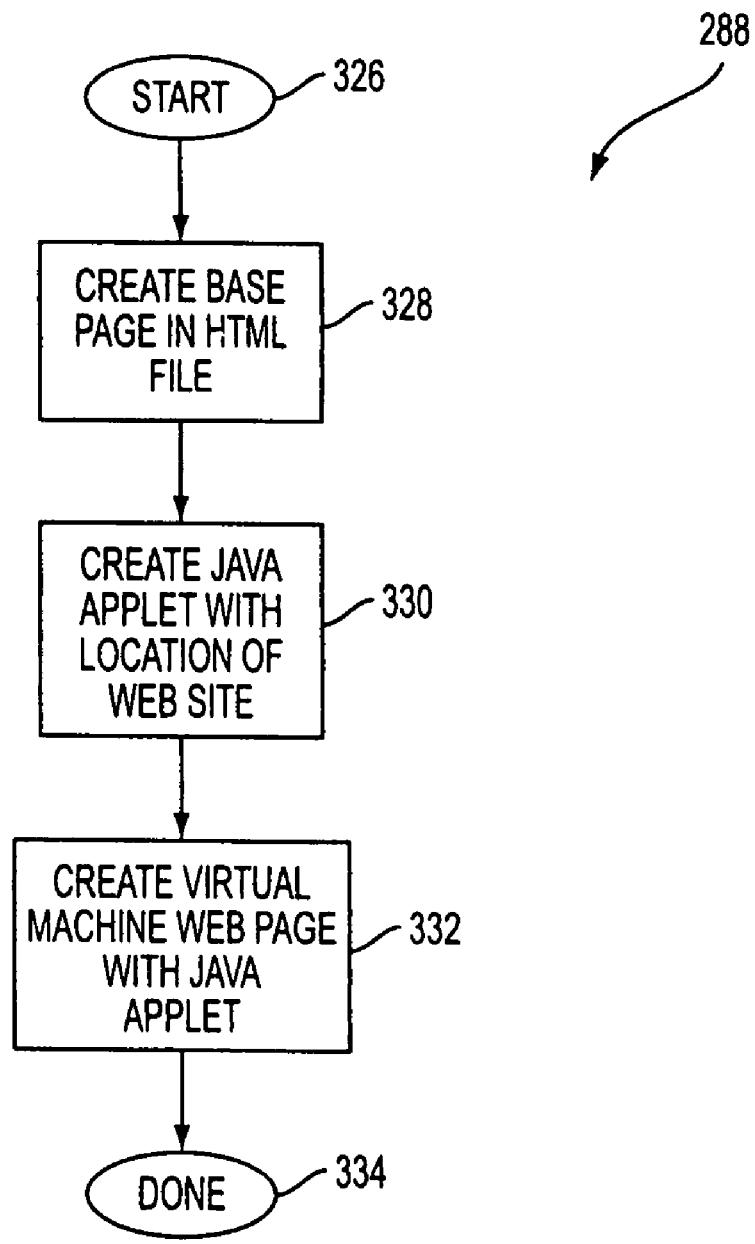
FIG. 7 illustrates the "Create Base Page and Virtual Machine Page" step 288 of FIG. 5 in greater detail.

In FIG. 7, the step 288 "Create Base Page and Virtual Machine Page" of FIG. 5 is disclosed in greater detail. More particularly, process 288 begins at 326 and, in a step 328, a base page HTML file is created. The creation of web pages with HTML file is well known to those skilled in the art, and there a variety of utilities available on the commercial market for the creation of pages with HTML files. Next, in a step 330, a Java Applet with the location of the web site is made available. In other words, a Java Applet script of FIG. 2 is created, modified, or used in its stored form. Finally, in a step 332, a virtual machine web page with the Java Applet is created. The process is then completed at 324.

Figure 8:
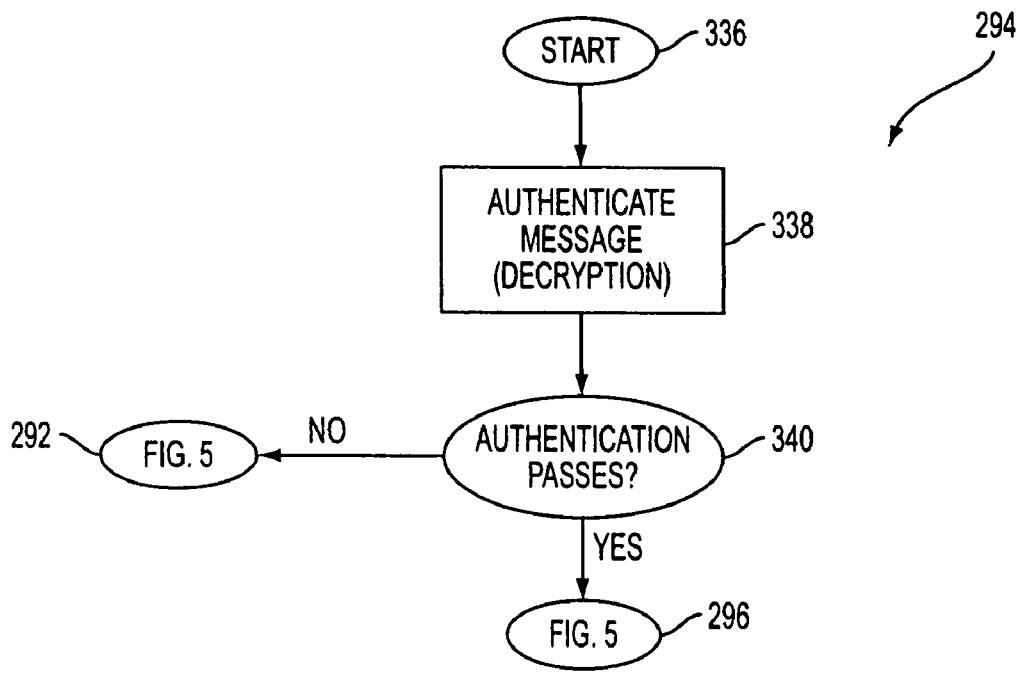
FIG. 8 illustrates the "Decryption Validation?" step 294 of FIG. 5.

In FIG. 8, the step 294 "Decryption Validation" of FIG. 5 is illustrated in greater detail. A process 294 begins at 336 and, in a step 338, the message is "authenticated."This authentication involves the decryption of the message using a supplied password. A step 340 then determines whether the authentication passes and, if so, process control is turned over to step 296 of FIG. 5. If authentication does not pass, process control is turned over to step 292 of FIG. 5.

Figure 9:
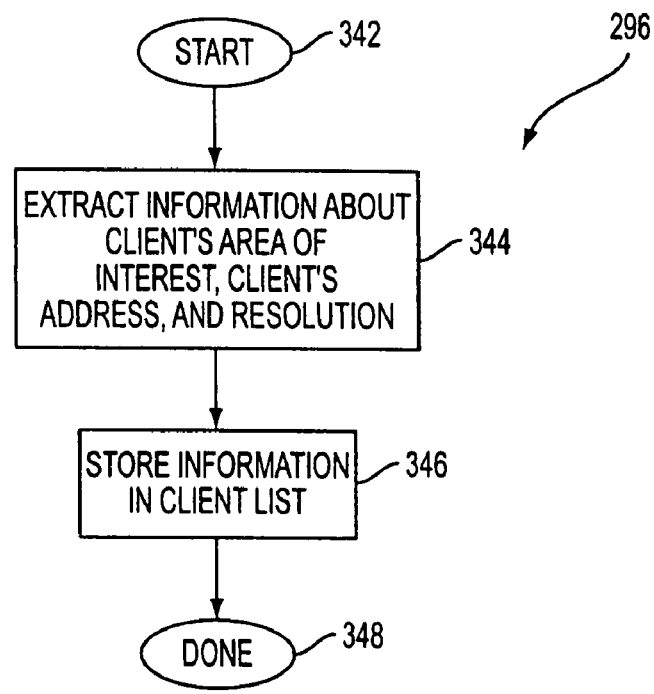
FIG. 9 illustrates the "Pre-Process Information" step 296 of FIG. 5.

In FIG. 9, the step 296 "Pre-Process Information" of FIG. 5 is illustrated in greater detail. The process 296 begins at 342, and a step 344 extracts information about the client's area of interest, the client's address, and the resolution of the client computer screen. This information is stored in a client list step 346, and the process is completed at 348. The client list can include multiple clients, each of which will have information concerning their areas of interest, their Internet address, and their screen resolution.

Figure 10:
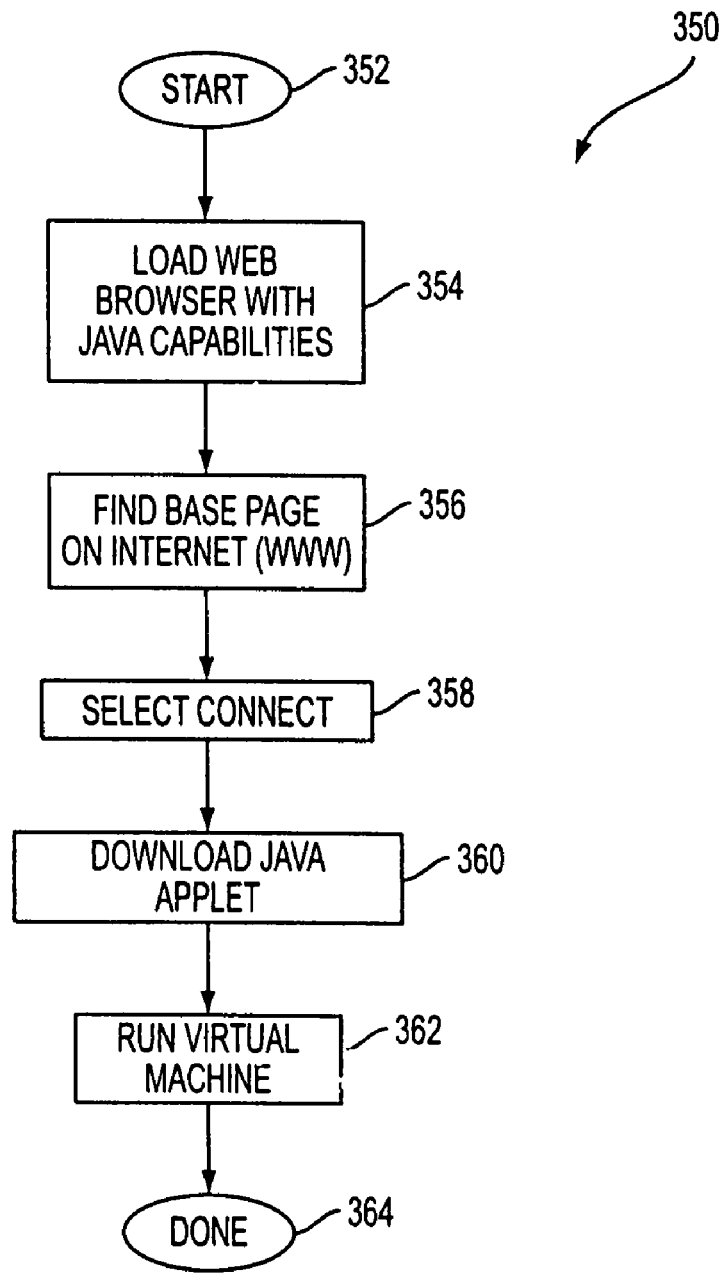
FIG. 10 illustrates a process 350 of the present invention implemented on a client machine of the system of FIG. 1.

In FIG. 10, a process 350 for running on a client machine (such as computer system 18) is disclosed. This client process can be implemented completely in commercially available software, and is described herein for the sake of completeness. The process 350 begins at 352 and, in a step 354, a web browser with Java capabilities is loaded. As noted previously, the Netscape web browser with Java is suitable for use of the present invention. Next, in a step 356, a base page is found on the Internet World Wide Web (WWW). This is accomplished by using the navigation functions of the web browser. Next, in a step 358, the client selects the "connect" option of the base page of the present invention, and in a step 360, a Java Applet is downloaded to the client system. A step 362 then runs the "virtual machine," which essentially is running the host computer system while displaying the video and other outputs on the client computer system, with inputs to the client computer system being transmitted to the host computer system. The process is then completed at 364.

Figure 11:
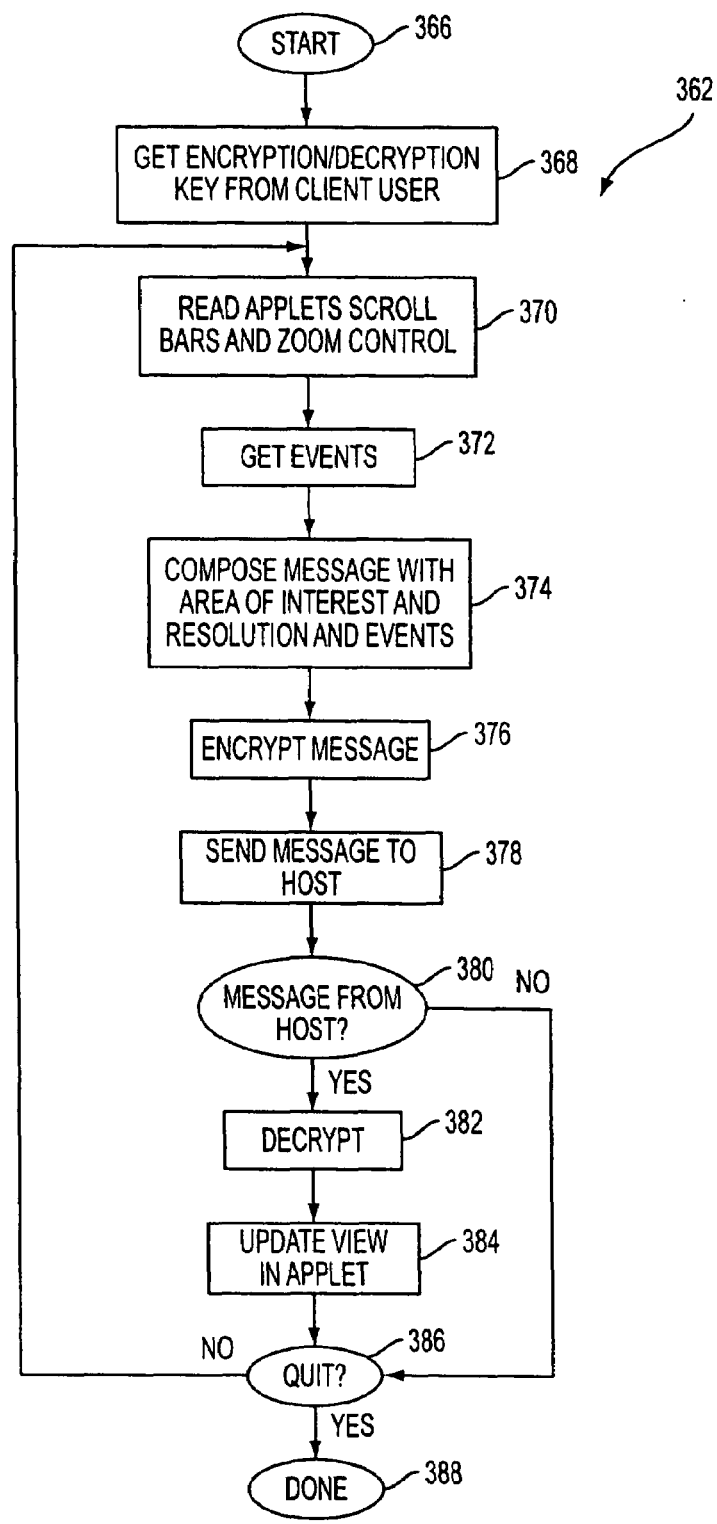
FIG. 11 illustrates the "Run Virtual Machine" step 362 of FIG. 10.

The step 362 "Run Virtual Machine" of FIG. 10 is illustrated in greater detail in FIG. 11. Process 362 begins at 366 and, in a step 368, the encryption/decryption key ("password", "keyword", etc.) is obtained from the client user. Next, in a step 370, the Applet's virtual machine window's scroll bars and zoom control are read. A step 372 gathers events from the client user. Next, in a step 374, a message is composed with an area of interest in the client computer screen (i.e. in the client computer's video frame buffer), along with the appropriate resolution and events. The composed message is the encrypted in a step 376, and is sent to the host in a step 378.

A decision step 380 determines if there is a message from the host. If there is, the message is decrypted in a step 382, and then the Applet controlled virtual machine window is updated in a step 384. In other words, the image information transmitted over the TCP/IP network from the host machine to the client machine is displayed in the browser window of the client machine, as appropriate. If there is no message from the host, or after updating the virtual machine window, it is determined in a step 386 if the process 362 is to be terminated. If not, process control is returned to step 370. If the process 362 is determined to be terminated in a step 386, the process is completed at 388.

The use of Java and Applets is well known to those skilled in the art and is described, for example, in *Hooked on Java, Creating Hot Web Sites with Java Applets*, Arthur van Hoff, Sami Shaio, and Orca Starbuck of Sun Microsystems, Inc., Addison-Wesley Publishing Company, 1996, the disclosure of which is incorporated herein by reference.

Again, by "virtual machine," it is meant that the functionality of a computer system, such as computer system 14, can be accessed by another computer system, such as computer system 18, in such a fashion that it appears that there is a "virtual" computer running in a window of computer system 18 from the Internet. Therefore, by "posting," i.e. "entering," a computer system 14 onto the Internet 18, a "host" computer is posting itself as a "virtual machine" for use by others, i.e. "clients." By accessing a "virtual machine" on the Internet, a user or "client" can operate and run the "virtual machine" from their own computer.

By "collaboration," it is meant that multiple clients can access a single host machine simultaneously. For example, if computer systems 16 and 18 both desire to access the virtual machine of computer system 14, this would be possible if collaboration were permitted. This functionality permits network-wide collaboration over the Internet 12. Alternatively, if the host machine is running a multi-processing system, multiple clients can simultaneously access processes on the host machine. For example, if the host machine is a personal computer running Windows NTT from Microsoft Corporation of Redmond, Wash., each client ("web user") could occupy its own window, or some windows could be shared by multiple clients.

If a computer system 12 which has become a client ("web user") of a host ("advertiser") machine 14, the display can be "clicked" or selected to indicate that they wish to become a client. The connection is then made through the Internet such that the client computer 18 can eavesdrop on ("monitor") or remotely access ("control") the host machine 14 through the Internet. A password may be required for security reasons to prevent the unauthorized uploading or downloading of program code and data without the password, i.e. to prevent access to the remote computer. For example, by eliminating remote access absent the correct password, a computer system 14 is given a degree of protection against computer viruses, unauthorized uploading of computer files, etc. It is therefore desirable for at least one of the client program on the client computer, the server computer, or the host computer implement password protection before allowing substantial "access" to the host computer.

It is therefore apparent that a method permitting the remote control of a host computer comprising in accordance with the present invention includes: (a) providing TCP/IP data packets including a client program to a client computer connected to a network and running a browser program having a browser window, the client program permitting the client computer to at control and view image output of a host computer also connected to the network; (b) receiving TCP/IP data packets at the host computer over the network that originated from the client computer, the data packets including remote computer control information produced in response to the manipulation of least one of a keyboard and a pointing device of the client computer; and (c) transmitting TCP/IP data packets including image information generated from the image output of the host computer to the client computer for use by the client program to provide images in the browser window, where the image output can be affected by the remote computer control information.

It should also be apparent that a method for controlling a computer over a network in accordance with the present invention includes: (a) providing a computer network that can communicate with a TCP/IP protocol; (b) coupling a host computer to the network; (c) coupling a client computer to the network, the client computer having a monitor capable of displaying images and an input device capable of generating input device events; and (d) controlling the host computer with the client computer via TCP/IP data packets sent over the network, such that the input device events of the client computer can be acted upon by the host computer, and such that display information of the host computer can be viewed upon the monitor of the client computer.

Figure 12:
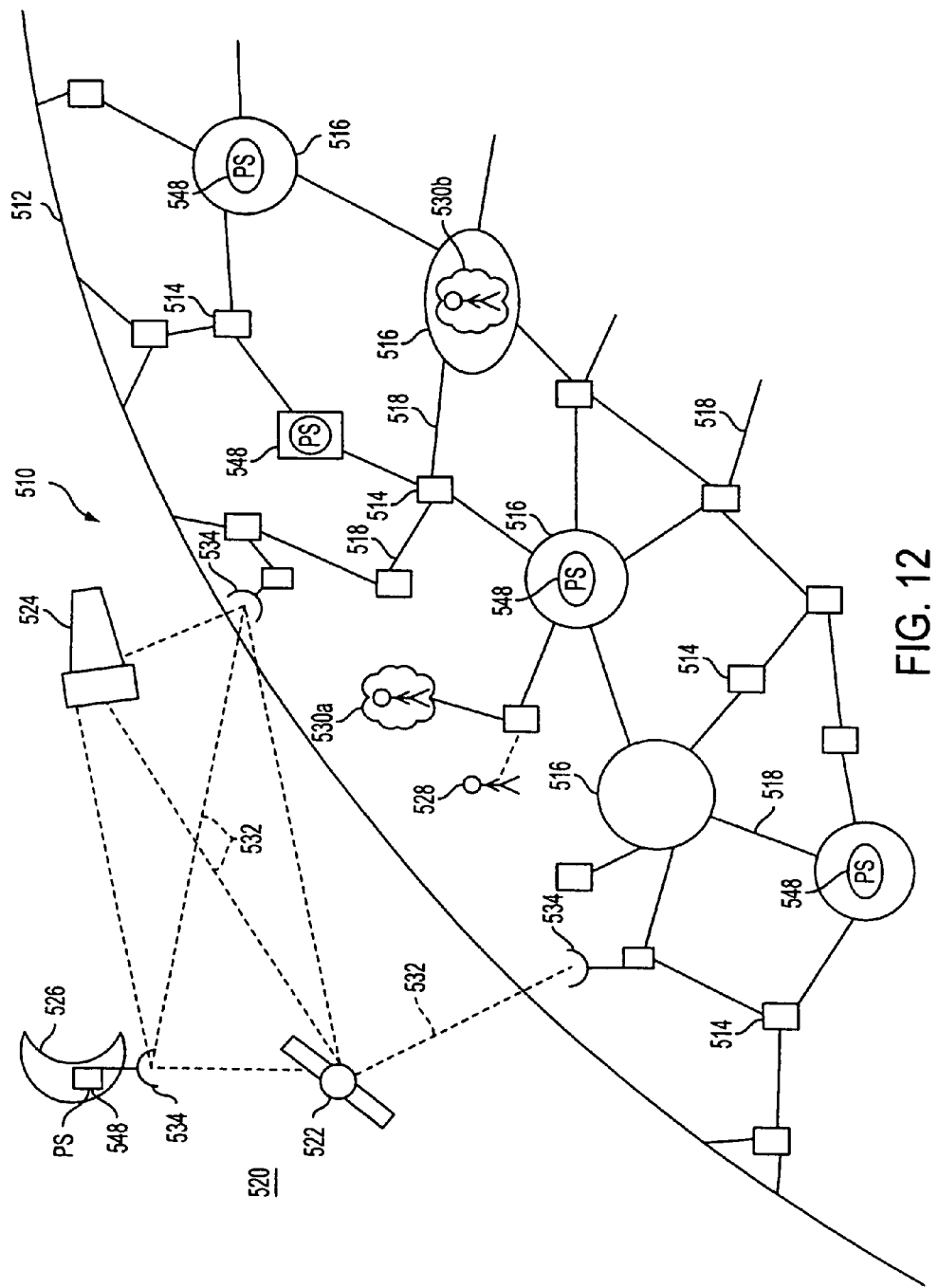
FIG. 12 is a pictorial representation of a wide area network capable of supporting the methods and apparatus of the present invention.

In FIG. 12, a wide area network (WAN) 510 capable of supporting the methods, processes, and apparatus of the present invention is illustrated. In this illustration, the World (i.e. the Earth) 512 includes a number of computers 514 and computer clusters 516 connected by transmission media 518 as a wide area network. In addition, the wide area network 510 includes "nodes", i.e. computers, in space 520 including, for example, nodes in satellites 522, spacecraft 524, and celestial bodies such as the moon 526 or other planets (not shown). The wide area network 510 permits communication among the various earth-bound computers as well as the computers found in space. Again, the present invention preferably subscribes to the Internet's TCP/IP protocols, although wide area networks subscribing to other forms of protocols can be considered to be equivalents.

It should be noted that FIG. 12 illustrates a wide area network distribution system using satellites, spacecraft, the moon, which will be collectively referred to as "earth-orbiting bodies." By using a number of earth orbiting bodies to receive and repeat, receive and route, and/or originate and send, data packets, the WAN of the present invention can provide nearly universal access over the face of the earth wherever an earth-orbiting body is within line of sight of a ground station. By "ground station" or "earth station") it is meant any computer or network node below orbital altitudes (e.g. on the ground, on the ocean, in the air) that can communicate with the earth orbiting bodies over a transmissive media such as radio, microwave, laser beam, etc.

For example, by providing a plurality of low earth-orbiting satellites that can communicate via TCP/IP compatible protocols with earth stations and, preferably, with each other, a nearly universal Internet access can be provided. Since a low orbit is considered to be desirable, inter alia, from transmission power and reception sensitivity points of view, it is desirable to provide dozens and preferably hundreds of such satellites to provide full coverage over broad geographical areas.

Since low orbits preclude geo-synchronous orbits, each individual satellite in the system will be moving across the sky from the point of view of a geographically "fixed" ground station. Therefore, for a particular ground station, it will be necessary to "pass off" from one satellite to another when the network is in extended communication with a particular "fixed" ground station. Since the orbits of each satellite is known, a knowledge of the geographical location of a particular ground station allows the system to calculate when the "pass off" should be made. Alternatively, the system can use heuristics, such as which satellites are just beginning to "hear" the transmissions of a particular earth station and which satellites can no longer "hear" the transmissions to determine to which satellite there should be a "pass off." In general, the routing of data packets should minimize the number of "hops", including minimizing the number of satellite-to-satellite, ground station-to-satellite, and ground station-to-ground station hops to reduce latency. Alternatively, for example, all satellites or all satellites that can "hear" a particular ground station could also send TCP/IP compatible packets, with some packet duplication that could be handled at the ground station. Conversely, all satellites that "hear" a particular ground station could place those TCP/IP compatible packets on the network, where the packet duplication problem could be handled at a convenient server. By "TCP/IP compatible packets" it is meant that TCP/IP packet information is includes, but additional transmission and re-transmission information can also be included to handle the complexities (e.g. packet duplication) of networks with radio transmission links and the like.

It should be noted that a ground station can be an Internet access provider, or it can be an individual computer system. In the case of an Internet access provider, a number of client computers are coupled to the Internet access provider for network communications and control, including two-way communication with the orbiting satellites or other earth orbiting bodies. In the case of an individual computer system or client computer, the communication link with the satellite may be unidirectional, e.g. only down from the satellite to the ground station or "downstream", so that the client computer may only receive Internet data by this link. An "upstream" link (i.e. from the client computer to and Internet access node) can be provided by a more conventional mechanism, such as using the telephone to access a Internet access provider via a modem. However, as bidirectional earth-to-satellite communication technology improves, two way or bidirectional links between client computers and the earth orbiting bodies is desirable.

Within the context of the present invention, the WAN 510 supports "real users" such as user 528 and "virtual users" such as virtual users 530a and 530b. As far as the WAN 510 is concerned, there is little or no difference between a real user 528 or a virtual user such as virtual users 530a and 530b. In either instance, the "user" can access and manipulate features of the wide area network by adhering to the protocols and procedures of the present invention.

By "virtual user", it is meant herein that a software program, executing on hardware that is a part of or which is connected to the WAN 510 (in this example, the Internet) that appears, for all intents and purposes, to be a real user, such as real user 528. The virtual user can be provided with many of the attributes of a real user, such as having the ability to perform useful work, the requirement for sustenance, the ability to reproduce, and the ability to die. As noted previously, prior art software programs known as "agents", "robots", "web crawlers", etc., may have had certain ones, but certainly not all, of these aspects. This is because, before the present invention, there was not a suitable "home" or "world" for a virtual user on the network which could be "rented" or "bought" by the virtual user to support its "life." The virtual user of the present invention will be discussed subsequently after a discussion of the systems, apparatus, method, and processes of the present invention that make it possible for the virtual user to be an economically feasible entity.

As will be appreciated from the above discussion, the present invention extends beyond the current concept of a "World Wide Web." As seen in FIG. 12, the WAN 510 is not limited to land-based communication channels (such as some of the communication linkages 518), but can also communicate with extraterrestrial computers ("nodes") via communication links 532. These links involve wireless transmission, such as from radio transmitter/receivers (transceivers) 534. The effect of such massive interconnection has the effect of converting all computing "nodes", data storage facilities, and other resources of the WAN 510 to behave, in certain ways, as a single, unified computer, i.e. the network becomes the computer. A user 528 or a virtual user, such as virtual users 530a and 530b, therefore has access to a massive computational system having a vast array of resources (some of which may not be accessible to a particular user or a particular class of users).

Figure 13:
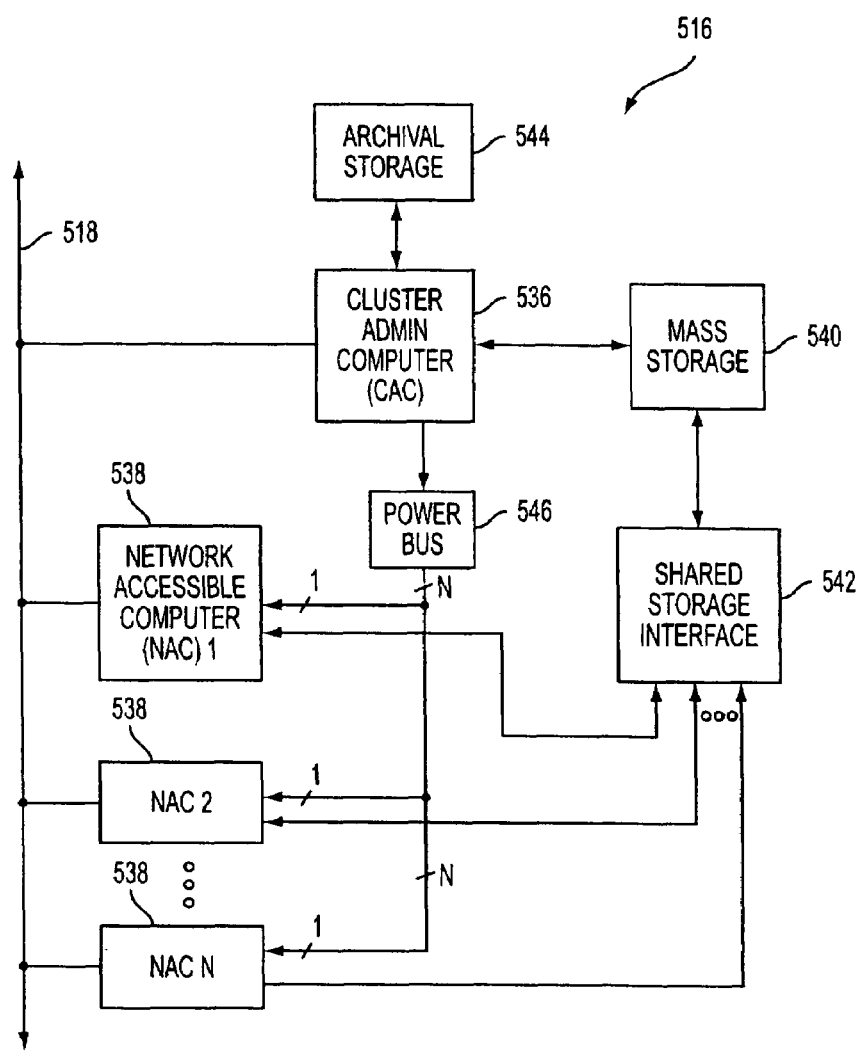
FIG. 13 is a block diagram of a cluster of network-accessible computers (NACs) illustrated in FIG. 12.

In FIG. 13, a block diagram of a cluster 516 is illustrated. A cluster 516 includes a cluster administration computer (CAC) 536, and one or more network-accessible computers (NACs) 538. In this instance, "N" NACs are provided in the cluster 516. These clusters 516 can include many hundreds or thousands of network-accessible computers 538 provided in the form of motherboards stacked into computer racks. This allows the addition of a NAC 538 to be a relatively inexpensive and straight-forward task. Each of the computers of the cluster 516 are fully functioning computer systems including central processing units (CPUs), non-volatile memory, volatile memory, data bus controllers, etc. An example of such a computer system is shown in FIG. 4. Each of the computers, including the CAC 536 and the NACs 538 are coupled to the Internet by a communication channel 518.

While the CAC 536 and the NACs 538 are fully functional computers, they also share certain resources. For example, the NACs share a mass storage 540, such as a large hard disk drive, or an array of hard disk drives. This mass storage 540 is accessed via a shared storage interface 542 which is coupled between each of the NACs 538 and the mass storage 540. In this way, an economy of scale is achieved which reduces the cost of storage for each of the individual NACs. In addition, the mass storage 540 preferably includes software programs that can be shared among the NACs 538. For example, three copies of a word processing program can be stored in mass storage 540, so that up to three NACs 538 can run the word processing software at any particular time. Furthermore, the NACs can share a common power supply, a common housing (e.g. a 19" rack housing), etc., common RAM memory, etc. to further increase the economies of scale.

To run software stored on shared mass storage 540, the software is downloaded into the NAC 528 through the shared storage interface 542, and then is "disabled" in the mass storage 540 as long as it is being run on the NAC 538. When the NAC 538 is done with the software, it is removed from the memory of the NAC 538 and is "re-enabled" on the mass storage 540. This enabling and disabling of software on the mass storage 540 can be accomplished by setting a bit indicating that the software is available or not available. The network-accessible computers 538 can include their own hard discs for local storage, or can include large random access memory ("RAM") discs that can temporarily hold such items as the aforementioned word processing software.

The cluster administration computer 536 is also coupled to the mass storage 540 and performs an "oversight" function for the cluster 516. For example, the CAC 536 can periodically back-up the mass storage 540 to an archival storage 544. This archival storage can be, for example, a tape back-up system or a magneto-optical CD-ROM system. In addition, as will be discussed in greater detail subsequently, the cluster administration computer 536 monitors the functioning of the NACs 538. If it is determined that a NAC needs to be restarted, either to activate a "personal state" of a user, or because the machine has "crashed", a power bus 546 is used to turn off the appropriate NAC, wait a short period of time (e.g. 5 seconds), and then turn the NAC back on. This, in virtually every instance, will reinitialize and reboot the appropriate NAC, and make it available for use by a user ("client").

Figure 14:
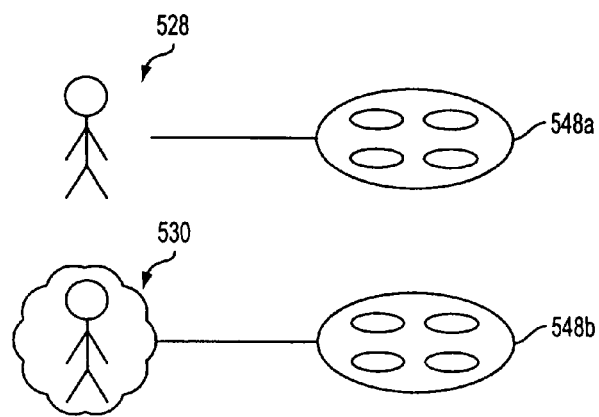
FIG. 14 illustrates a user and a virtual user and their associated "personal states"

In FIG. 14, a real user 528 and a virtual user 530 are illustrated, along with their "personal states" 548a and 548b, respectively. Personal states, referred to collectively as personal states 548, permit users (either real or virtual), to access a network-accessible computer 538 as if it were their own personal computer system. With brief reference to FIG. 12, these personal states 548 are preferably distributed throughout the Internet 510 in a redundant fashion to prevent the accidental loss of a user's "personal state." When a personal state changes, it is updated in each of the stored locations.

Figure 15:
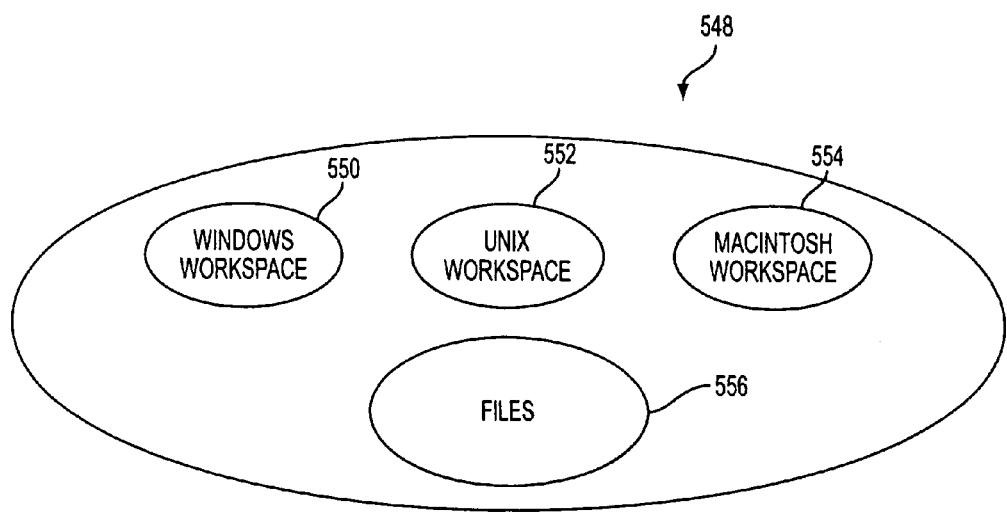
FIG. 15 illustrates, by way of example, a personal state of either a user or a virtual user.

In FIG. 15, a personal state is illustrated in somewhat greater detail. Assume, for example, that a user (either real or virtual), makes use of Microsoft Windows-based computer systems, Unix-based computer systems, and Macintosh-based computer systems. The personal state 548 then includes a Windows workspace 550, a Unix workspace 552, and a Macintosh workspace 554. The personal state 548 also includes data and other files 556. When a user accesses a NAC 538, the cluster administrator computer 536 determines the proper configuration for the NAC 538 from the personal state 548 and, preferably, reinitializes the computer such that the user's personal state is reflected in the computer's operating system. As an example, if a NAC 538 is a Macintosh computer, the cluster administrator computer 536 loads the Macintosh workspace 554 into the NAC. A personal state corresponding to the Macintosh workspace can include the file structure created by the user, whatever windows were open at the time the user last used a Macintosh, all of the system extensions or "inits" of the Macintosh, and even the values and the registers on the CPU and in the various peripheral units of the Macintosh. Of course, there can be multiple Macintosh workspaces, multiple Unix workspaces, etc., if the user wants to maintain, effectively, multiple computer system "flavors" for particular purposes. In addition, appropriate files and data from the files 556 of the personal state, are made available to the NAC 538.

The effect of the "personal state" being stored on the Internet is that the user has the same experience as if they had their own stand-alone personal computer on their desk. A low-powered, low-cost Internet box can be used to access a NAC 538 which then "boots-up" as the user's own personal computer. As long as the data communication rate between the Internet box and the NAC is sufficiently fast, the user can have a virtually identical experience with the Internet box as he or she would have with their own personal computer. However, and very advantageously, the computer would be a shared computer resource, resulting in lower costs per user. In addition, the cluster administration computer 536 takes care of several common tasks such as backing up the mass storage, maintaining updated versions of software on the mass storage 540, etc.

It should be noted that the personal state 548 need not be stored on the mass storage 540 associated with a particular NAC 538. In fact, in most instances, it will be stored elsewhere on the Internet. However, with sufficiently high data rates, the actual location of the data on the Internet becomes irrelevant as long as the appropriate NAC can access the data sufficiently quickly.

It should also be noted that although a user can access a NAC anywhere on the WAN, that it is usually better to connect to a NAC that is the fewest "hops" away. In this description a "hop" is used synonymously with "node" in that TCP/IP packets are routed from node-to-node (i.e. "hop" from node to node) between the host and client computers. Since each node will cause a brief delay (due to "latency") as they receive and re-transmit the TCP/IP packets, overall performance, i.e. the overall speed of transmission of the packets, will be directly related to the number of "hops" that have to be made between the host and client computers. The browsing capabilities of the WWW can be used to select a NAC that is the fewest "hops" from the user's machine. Of course, other factors that the number of "hops" are also related to packet transmission speed, such as the speed of communication links between specific nodes. Therefore, the present invention preferably optimizes overall performance based upon a variety of factors, including the number of hops, the transmission speed of specific communication links, etc.

It is therefore apparent that the "virtual machine" process of the present invention permits the expensive and difficult computational tasks to be distributed over the Internet rather than residing on the desktop of the user. Therefore, most users will find it sufficient to have inexpensive Internet boxes costing, perhaps, one-quarter to one-tenth as much as a full-blown, desktop personal computer system, which can be the "client" of a "host" NAC 538 on the Internet. Since the NACs 538 can be shared among the many millions of users of the Internet, the cost per user decreases while the experience of the individual user remains essentially the same or improves.

The clusters 516 can be maintained for either private or public use. When used privately, the cluster 516 can be provided by a company for use by their employees. Since, typically, employees are not all using their computers simultaneously, there can be fewer network-accessible computers (NACs) 538, than the number of employees having access to the NACs. Again, the access to the NACs can be either through the Internet, through a private Intranet, or through other network protocols. If, for example, it is determined that the average computer user of a corporation uses their personal computer thirty percent of the time, the company may provide one-half as many NACs 538 as they have employees. This will generate a substantial cost savings.

If the cluster 516 is public in nature, it is likely that the provider of the cluster 516 will charge or "rent" access to the NACs 538. This provides a scenario for a fully functional and viable virtual user 530 that can inhabit the Internet at large. In this instance, the virtual user is created (either by a real user or another virtual user), and is provided with a certain amount of "start-up capital" in the form of credit that is backed by a real currency. For example, this credit could be "cyber dollars" that are ultimately convertible to real money, or could be a credit line with, for example, and electronic bank. This start-up capital allows the virtual user 530a to rent time on a NAC 538. If the start-up capital is small, the virtual user 530a will most likely choose a "low rent district", i.e., a low-powered and therefore inexpensive NAC 538, such as a 80286-based personal computer. The virtual user can then advertise and perform useful services on the Internet 510. For example, the virtual user 530a can be a "handyman" who goes to various computer systems 514 and clusters 516 to de-fragment their hard disk, analyze their system for faults, or otherwise optimize their systems. Alternatively, the virtual user 530 can monitor the packets flowing along the Internet or become a "web crawler" to gather information that might be useful to other real and virtual users. The virtual users are "paid" for performing these useful tasks (using real or "cyber" credit), which permits the virtual user to accumulate wealth. Some of this wealth can be transferred to other real or virtual users, can be used to purchase services, or it can be used to "upgrade" the habitat of the virtual user, i.e., to allow the virtual user to occupy a NAC of greater power. In addition, once the virtual user has accumulated sufficient capital, it can create clones or "offspring" and provide them with sufficient capital to inhabit their own NAC. Also, two or more virtual users can merge and work together. For example, a virtual user that is good at detecting software viruses might join forces with a virtual user that is good at de-fragmenting hard disks for co-marketing purposes. Presumably, if a virtual user 530 runs out of capital, it would "die", in that it would not have access to a NAC 538, unless capital could be "borrowed" from another real or virtual user. The ability to merge, reproduce, and die adds a Darwinian selection aspects to virtual users which ensures that the most effective virtual user traits will be propagated.

Figures 16, 16A:
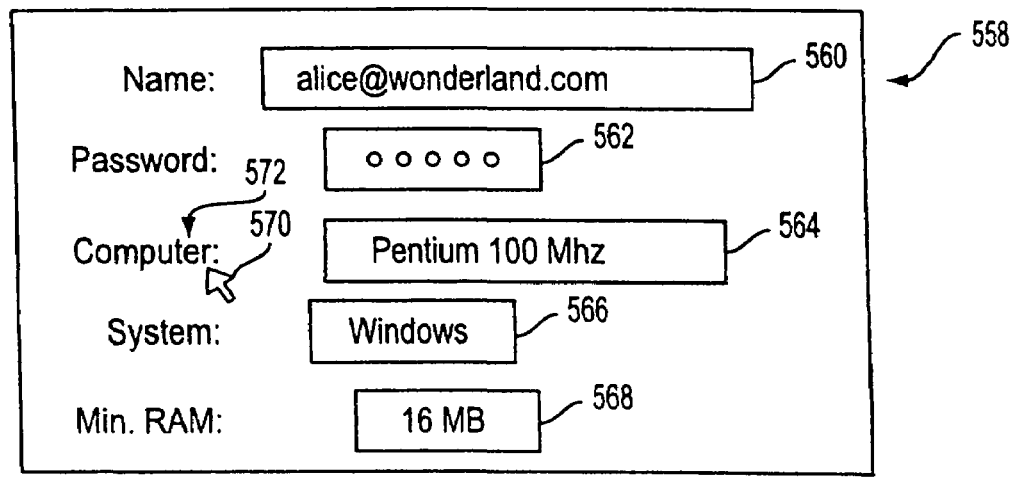
FIG. 16 illustrates an information entry window allowing a user or a virtual user to have access to a network-accessible computer (NAC)
FIG. 16a is a view of a pop-up window used to select the computer CPU in the information window illustrated in FIG. 16.

In FIG. 16, an interface 558 to a cluster administration computer 536 is illustrated. Again, either a real user 528 or a virtual user 530 can obtain access to a CAC 536, such as through the interface 558. The interface 558 includes, by way of example, five entry windows including entry windows 560, 562, 564, 566, and 568. In the present embodiment, it is preferred that the entry windows 564, 566, and 568 include "pop-up" windows, as will be explained in greater detail with reference to FIG. 16A.

A pointer 570 can be used to select a particular entry window 560–568. The user (real or virtual) enters their name and address in window 560 (real users typically use keyboard, while virtual users would emulate keyboard entry), and a cluster entry password in a window 562. If the cluster 516 accepts this name and password, a computer CPU-type can be selected in a window 564. The pointer 570 can be used to "click" on the word 572 "computer" to create a pop-up window 574, listing all of the computers CPU types available on that particular cluster 516. In this instance, the pointer at 570a has selected a Pentium 100 MHz CPU computer for entry into window 564. The system type information is entered into entry window 566, and the minimum RAM requirement is entered into entry window 568 in a similar, fashion, i.e., it is either typed into the windows 566 or 568 via a keyboard, or is selected from a pull-down menu similar to the pull-down menu 574 illustrated in FIG. 16A with a pointer or equivalent. At this point, the cluster administration computer has the information required to allow access to a network-accessible computer 538 and to put the personal state of the user into the selected computer.

Figure 17:
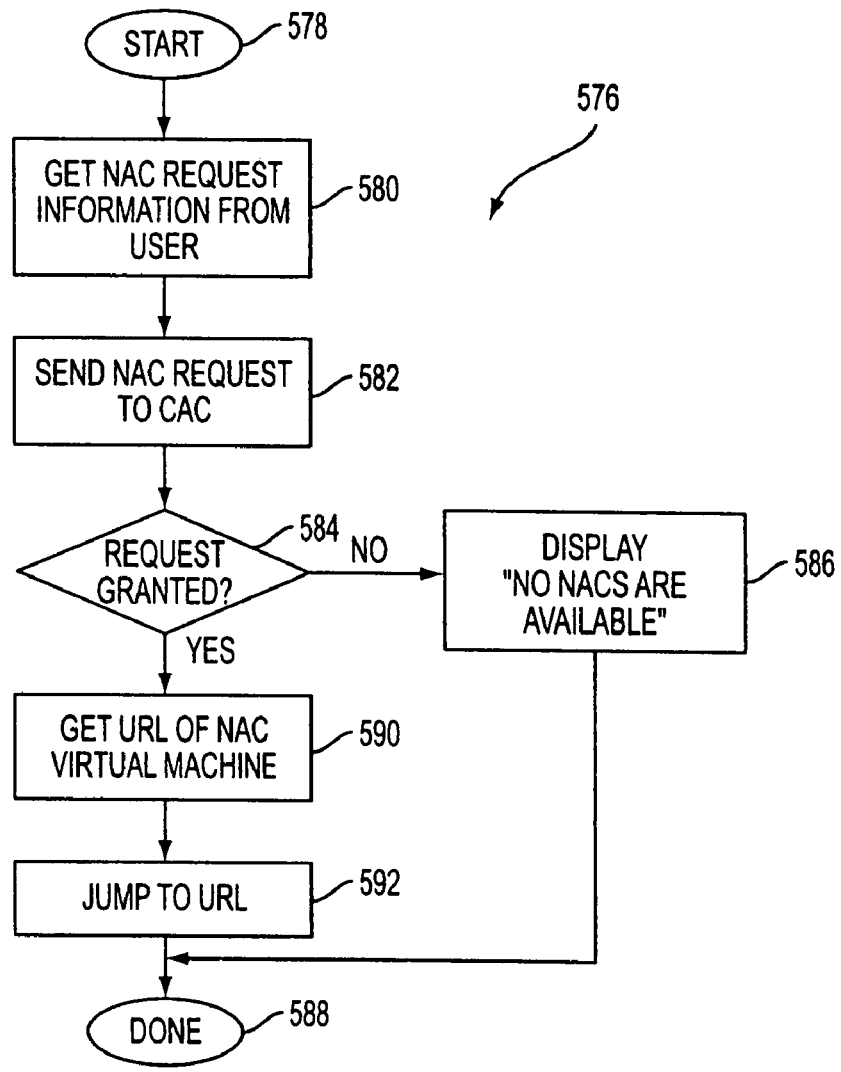
FIG. 17 is a flow diagram of a process running on a user computer.

In FIG. 17, a process 576 running on a client computer (such as client computer 18) which allows access to a cluster 516, is shown. The process 576 begins at 578 and, in a step 580, the NAC request information is received from the user through an appropriate medium, such as through the interface 558, illustrated in FIG. 16. Next, in a step 582, the NAC request is sent to a CAC 536 of a cluster 516. A step 584 determines whether the request is granted. The request may not be granted due to an improper user or password entry, or because there are no NACs available. In such instances, a step 586 displays that "No NACs Are Available", and the process is completed at 588. The user can then repeat the process 578, designating a different cluster 516. If step 584 grants the request, the URL of the NAC 538 which is to serve as the "host" of a "virtual machine" running on the client, is obtained in a step 590. The process then jumps to that NAC 538 URL, and the "virtual machine" process described previously is then conducted. As the user uses the "virtual machine", his or her personal state is updated on the Internet. After the user is finished with the virtual machine, the process 576 is completed as indicated at 588.

Figure 18:
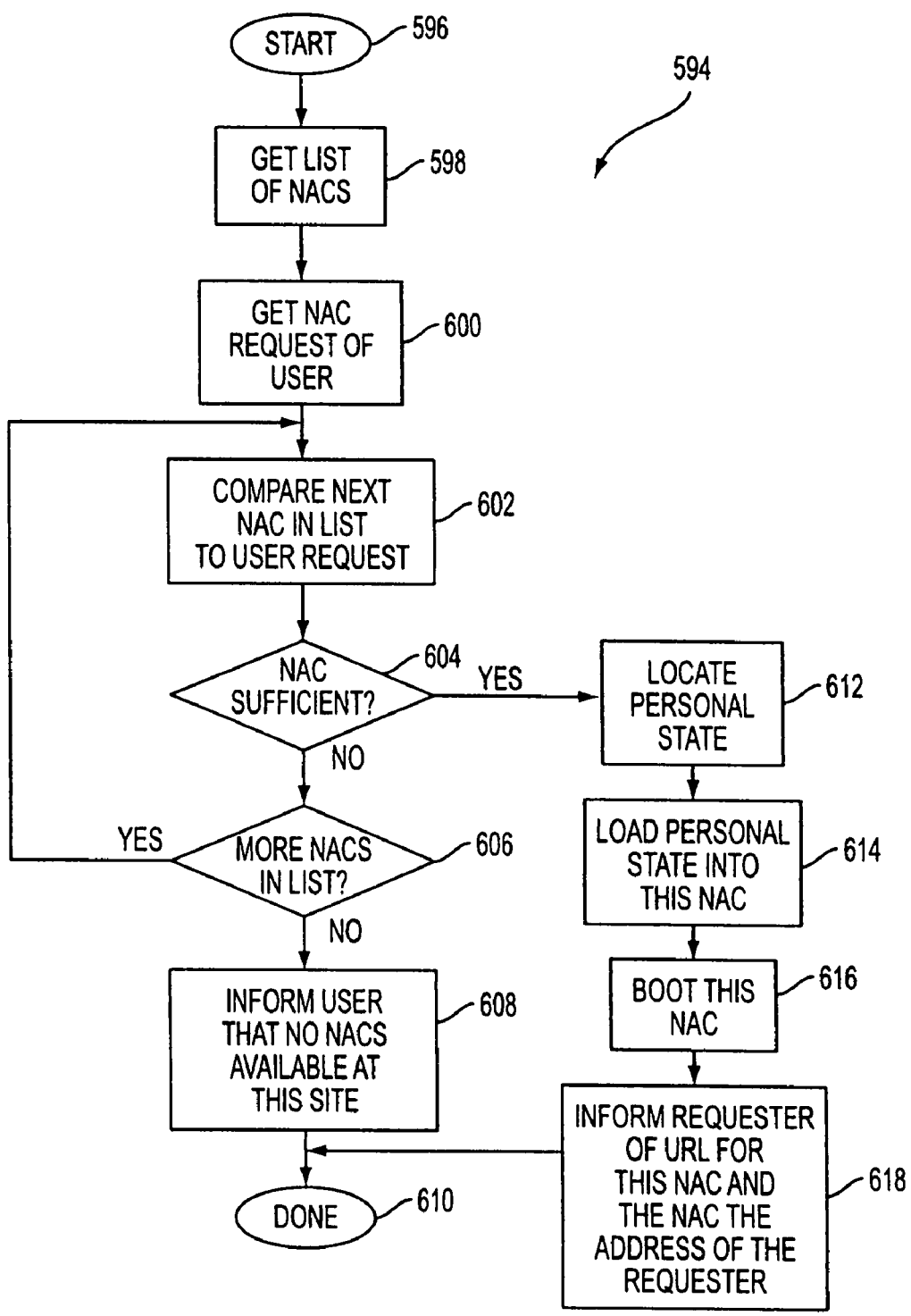
FIG. 18 is a flow diagram of a process running on the cluster administration computer (CAC) of FIG. 13.

In FIG. 18, process 594 running on the cluster administration computer 536 is illustrated. The process 594 begins at 596 and, in a step 598, a list of the NACs 538 of the cluster 516 is obtained. Next, the NAC request of the user is obtained in a step 600, such as via the interface 558 of FIGS. 29 and 29a. In this instance, it will be assumed that the name and password of the user are sufficient to allow entry into the cluster 516. If the entry criteria are not met (i.e. if the name and password do not meet muster), the step 586 of FIG. 17 will display that no NACs are available and the process will be completed at 588.

Next, in a step 602, the next NAC on the list is compared to the user's request. If the next NAC 538 in the list is not sufficient (i.e., it does not meet the minimum requirements of the user), a step 606 determines if there are more NACs on the list. If there are, process control is returned to step 602 to compare the requirements of the user to the next NAC in the list. If step 606 determines there are no more NACs in the list, the step 608 informs the user that there are no NACs available at the site that meet their requirements. In other words, step 608 is a form of request denial of step 584, allowing the display of the "No NACs Are Available" dialog of step 586. The process is then completed at 610.

If step 604 determines that the NAC is sufficient, the personal state of the user is located on the Internet in step 612. This is preferably accomplished by a File Transfer Protocol (FTP) transfer from the computer storing the personal state, typically designated by the user's name (e.g. "alice@wonderland.com"). Once located, a step 614 loads the personal state into the NAC 538. Step 616 then "boots" the NAC, i.e., a "hard" or "power-on" reset of the NAC 538 loads the personal state of the user into the desired NAC. Finally, in a step 618, the user ("requester" or "client"), is informed of the URL for the NAC that will serve as their "virtual computer." Also in this step, the NAC is informed of the address or URL of the client machine so that a "connection" can be made, i.e. the host machine and the client machine will be aware of each other's address for mutual data communication over the network.

Figure 19:
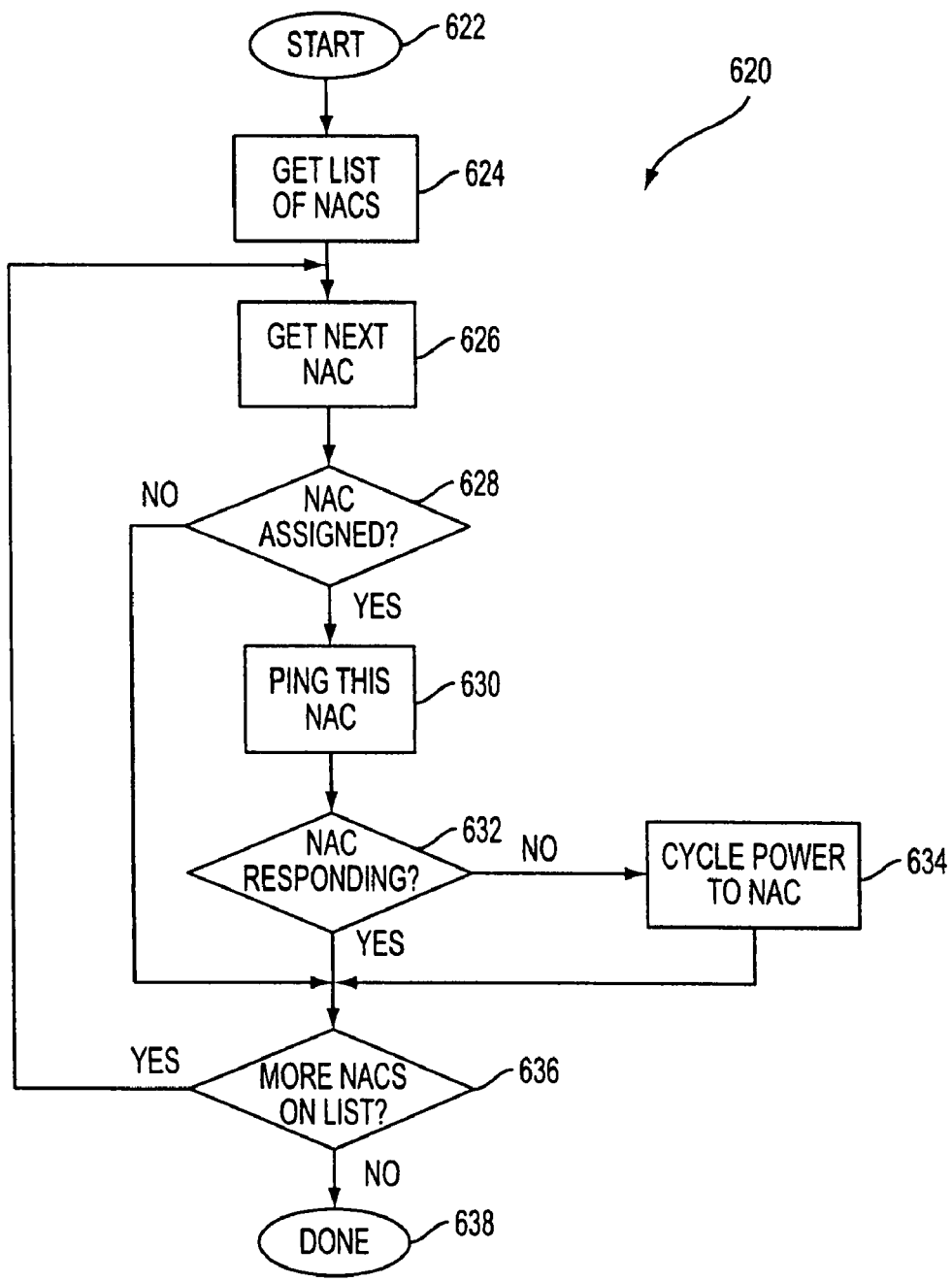
FIG. 19 is a flow diagram of another process running on the cluster administration computer (CAC) of FIG. 13.

In FIG. 19, the process 620 also running on the cluster administration computer (CAC) 536 is illustrated. This process 620 is used to determine when a NAC 538 has "crashed", i.e., is no longer operating properly. The process 620 begins at 622 and, in a step 624, the list of NACs 538 for the cluster 516 are obtained. In a step 626, the address of the next NAC is obtained. The step 628 determines if the NAC is assigned. If it is, the NAC is "pinged." By "ping", it is meant that the CAC 536 sends an inquiry to the NAC 538 asking if it is operating properly. If there is no response, or if the response is to the negative, the CAC determines that the NAC 538 is not operating properly. Alternatively, the CAC 538 can simply monitoring the functioning of the NACs 538, or wait for periodic messages from the NACs that they are operating properly. To implement these features, the NAC 538 would, in general, run a simple software utility to provide the necessary information to the CAC 536 by a chosen methodology.

If the CAC 536 determines that a NAC 538 is not responding, or that the NAC is responding but it is not operating properly, the power to the NAC 538 is "cycled." With brief reference to FIG. 13, this is accomplished through the power bus controller 546 which turns off the power to the improperly functioning NAC 538, waits for a predetermined period of time (e.g., five seconds), and then turns on the power to the NAC 538. This is essentially the same process as a "hard boot" or "power-on reset" of a personal computer. Then, after the completion of step 634, or after the determination that the NAC is not assigned in a step 628, a step 536 determines if there are more NACs on the list. If yes, process control is returned to step 626. Otherwise, the process is completed at 638. The process 620 will be performed regularly by the CAC 536, e.g., every minute or so.

Figure 20:
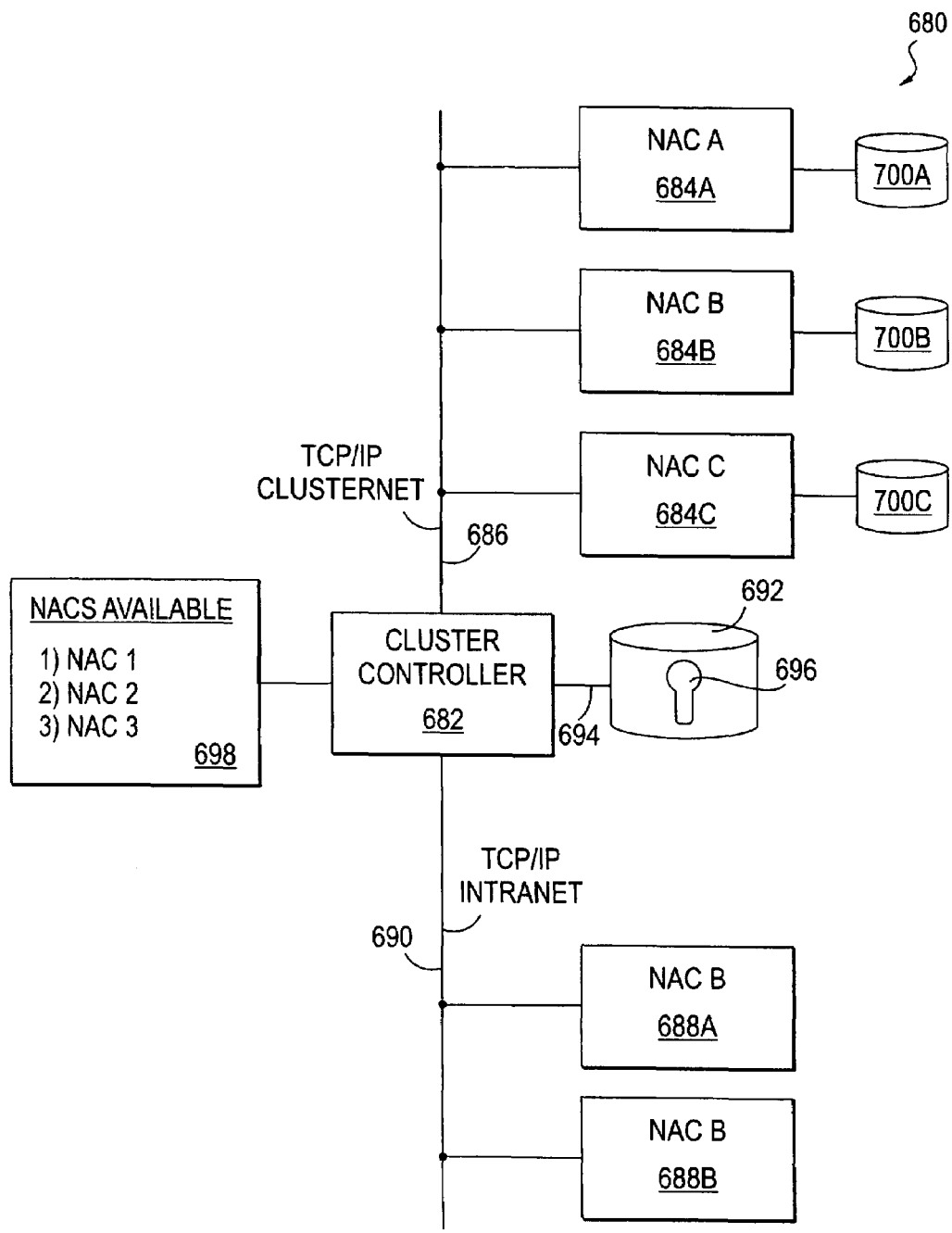
FIG. 20 is an illustration of an alternative cluster computer system of the present invention.

In FIG. 20, a cluster computer system 680 includes a cluster controller 682 (previously referred to as a cluster administration computer). A number of network accessible computers 684a, 684b, and 684c preferably coupled to a TCP/IP compatible Clusternet™ network 686, and a number of network computers (NC) 688a and 688b attached to a TCP/IP compatible network such as an Intranet 690 or to the Internet. The cluster controller 682 therefore serves as a "bridge" between two TCP/IP networks, i.e. the Clusternet network 686 and the Intranet 690. In this fashion, data traffic on the Clusternet network 686 does not affect traffic along the Intranet 690, except if there is communication between the Clusternet network 686 and the Intranet 690. The cluster controller accomplishes this by examining packets on the two networks 686 and 690 and passing on only those data packets which are addressed to a device on the other network.

The design and operation of TCP/IP networks, such as Intranet 690, are well-known to those skilled in the art. Likewise, network computers (NC), such as network computers 688a and 688b are well-known to those skilled in the art and are being marketed by such companies as Sun Microsystems, Inc. and Oracle Corporation. Likewise, web browsers that run on the network computers 688a and 688b are available from a variety of sources including Netscape Corporation and Microsoft, Inc.

The cluster controller is preferably a powerful personal computer system or workstation system. For example, a personal computer available from a variety of sources and operating with a Intel Pentium microprocessor or beyond would be a good choice. In addition, it is preferable to use a robust, powerful operating systems, such as the Windows NT™ operating system available from Microsoft Corporation, as the operating system for the cluster controller 682. The cluster controller 682 preferably has a large storage device, such as a disk drive 692 which is accessed by a high speed data bus 694 for storing data. For example, a "personal state" 696 can be stored on the disk drive 692. Personal states were described previously.

The cluster controller 682 performs a variety of functions. For one, it serves as a "web host" for its own web site such that it can host one or more web pages, such as web page 698. It can also serves as a conduit to data on the disk 692 for the various NACs 684a–684c on the Clusternet network 686, i.e. it can serve as a file server. It can also serves as a conduit for the transfer of data with disk drive 692 with devices coupled on the Intranet 690, i.e. as a network accessible hard drive. The cluster controller 682 also serves a bridge or "routing" function by examining the data packets on the networks 686 and 690, and passing packets from one network to the other if those packets are addressed to devices on that other network. The cluster controller 682 can also receives its own data packets from either the Clusternet network 686 or the Intranet 690 for its own use. In addition, the cluster controller monitors and controls functions of the NAC 684a–684c to ensure their proper functioning.

The NACs 684a–684c are, again, preferably personal computers, workstations, etc. configured for remote access by network computers (NCs). In the present invention, each of the NACs 684a–684c include their own mass storage, such as hard disks 700a, 700b, and 700c, respectively. If a NAC 684 is to be used as a "generic" NAC, the operating systems and application programs can be derived from its associated hard disk 700. However, such a generic NAC would not be personalized for a particular user. Alternatively, the hard disks 700a–700c can also include one or more "personal states" as described previously. Typically, such a personal state is activated on "boot-up" of the NAC 684, so that the computer has all internal states characterized for a particular user. This personal state can be written to the hard disk 700 of the associated NAC 684 from a remote storage site, such as the hard disk 692 coupled to the cluster controller 682.

Figure 21:
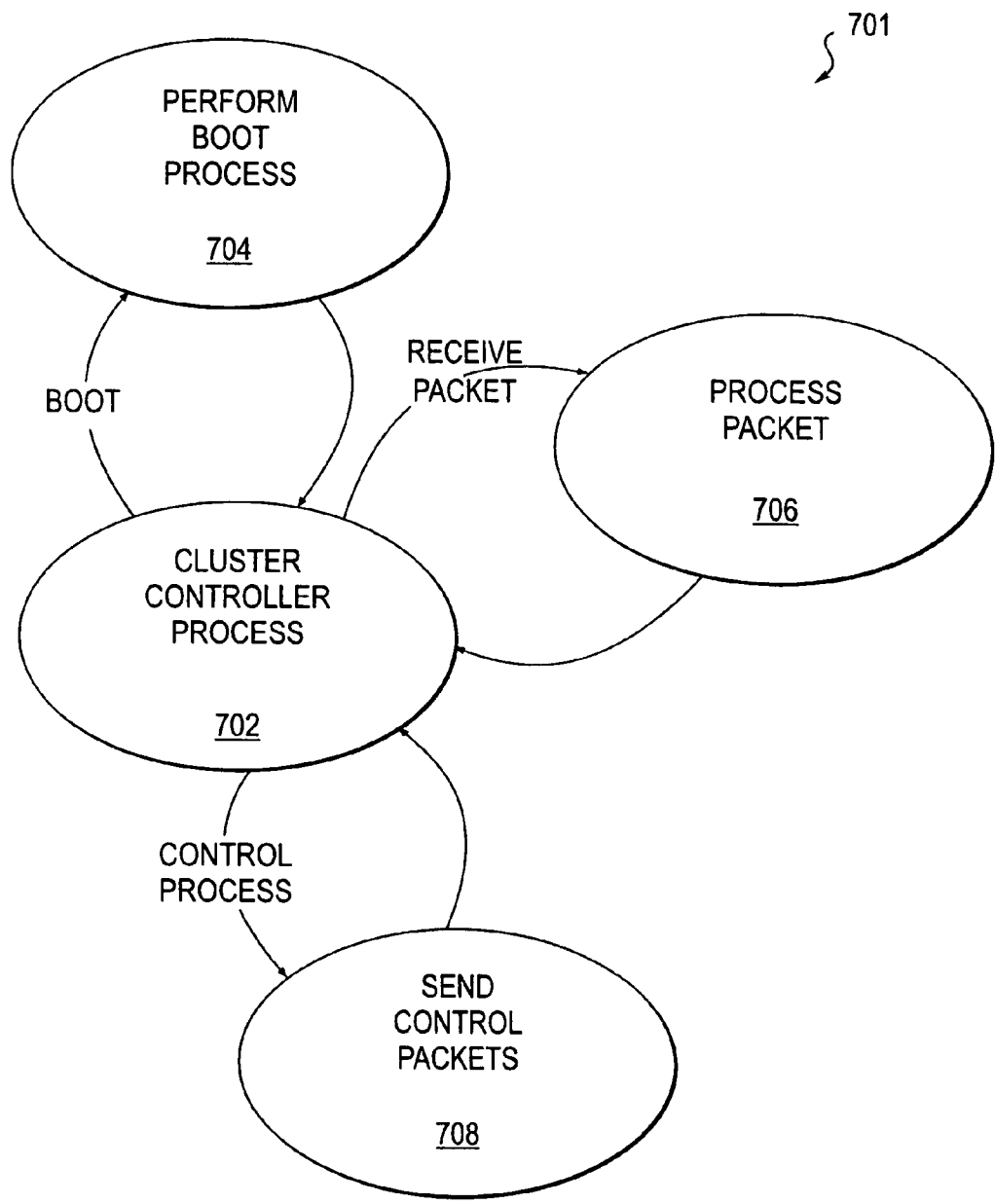
FIG. 21 is a flow diagram illustrating a process operating on the cluster controller of FIG. 20.

In FIG. 21, a process 701 implemented on the cluster controller 682 of FIG. 20 is illustrated. The process 701 includes a base or "root" process 702, a Boot Process 704, a Process Packet process 706, and a Send Control Packet process 708. The cluster control process 702 is the base, root or "idle" process wherein the system is waiting for a particular process or task to perform. One of these processes is the Boot Process which causes a "booting" of the computer comprising the cluster controller 682. By "boot" or "booting", it is meant that the computer is performing the low-level start-up routines that load the basic operating system and initial states into the computer memory and other storage locations within the NAC. Typically, booting starts with instructions stored in a ROM BIOS chip, and then continues with instructions stored at boot-level sectors of the hard disk. Another process performed by the cluster controller is the Receive Packet process where it receives a packet from either the Clusternet network 686 or the Intranet 690 and processes it accordingly. Yet another process of the cluster controller is the control process which sends control packets to either the Clusternet network 686 or the Intranet 690 to control a functioning of either a NAC 684 or a NC 688. Each of these processes will be discussed in greater detail subsequently.

Figure 22:
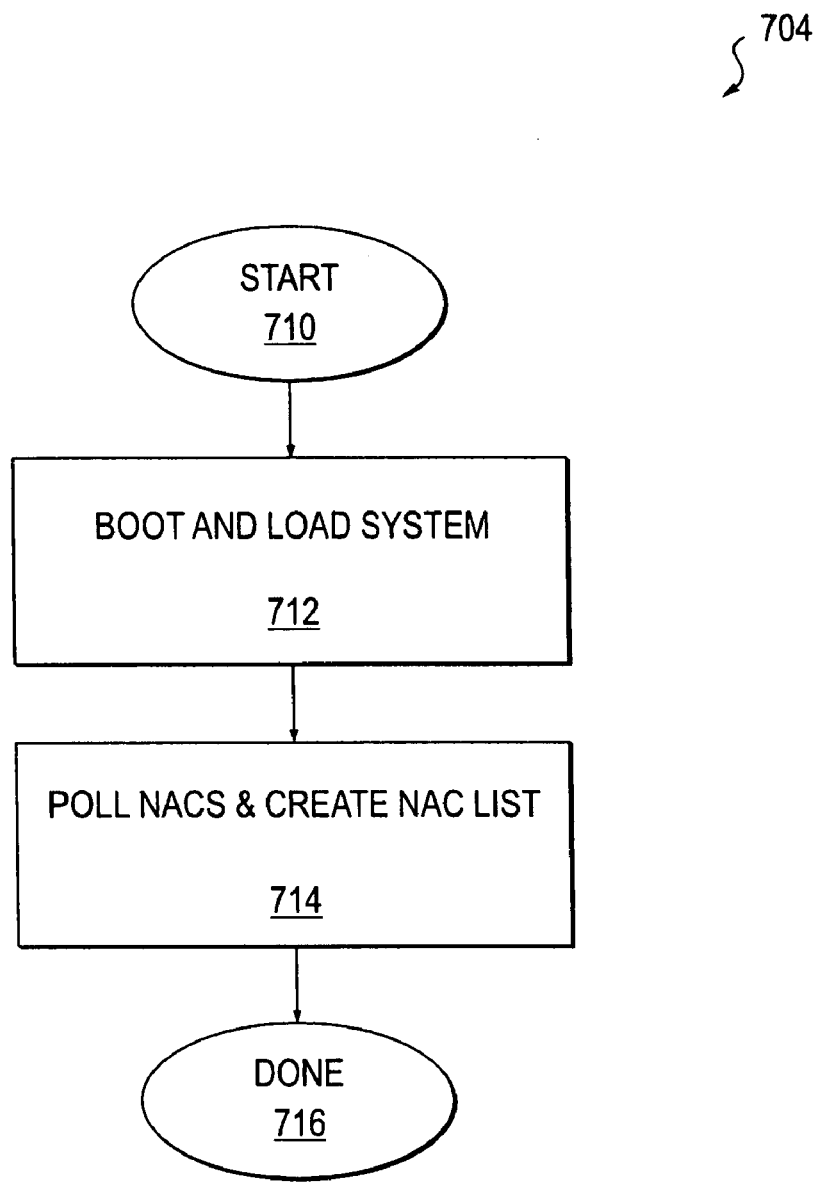
FIG. 22 is a flow diagram illustrating the Perform Boot Process of FIG. 21.
Figure 23:
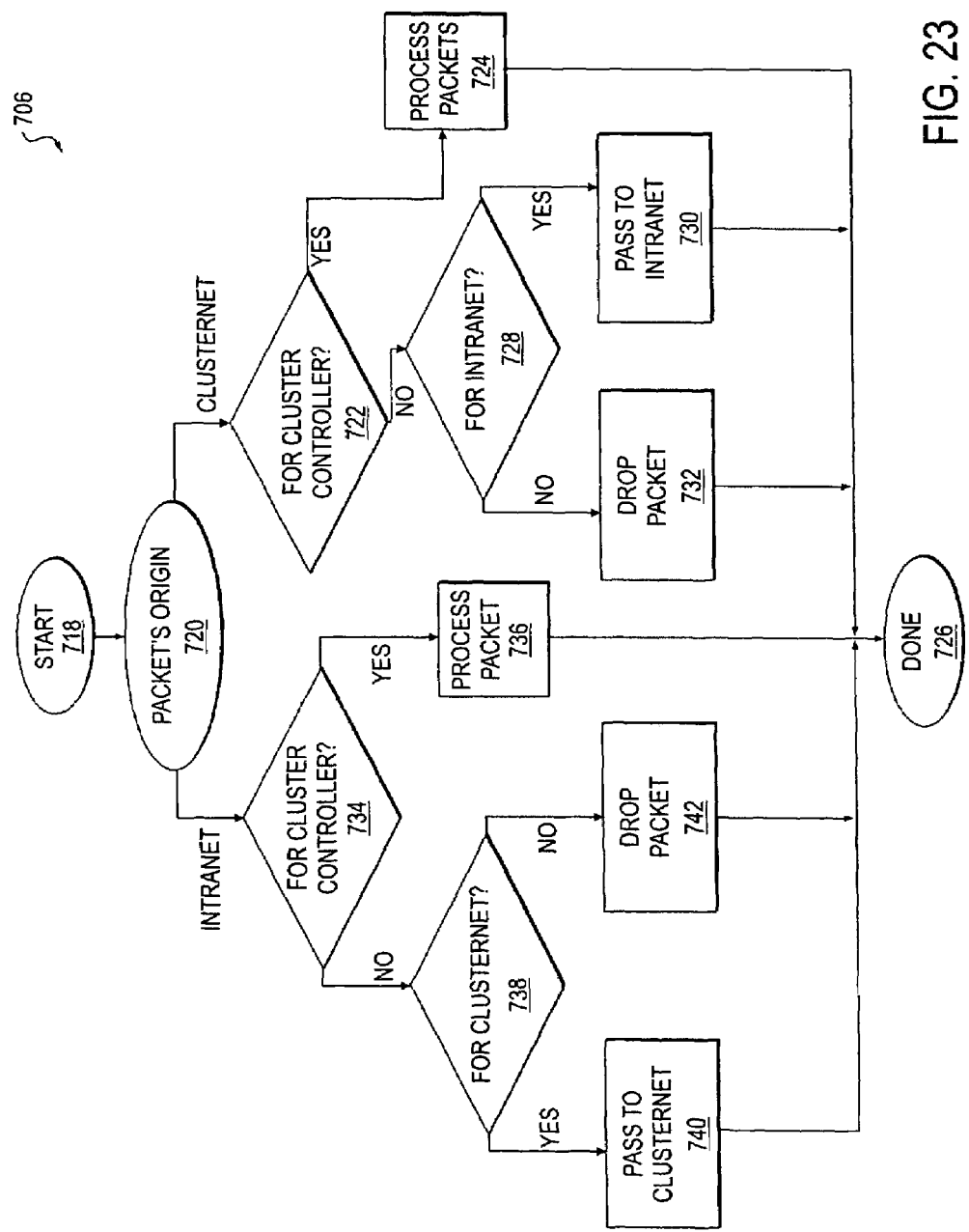
FIG. 23 is a flow diagram of the Process Packet process of FIG. 21.

In FIG. 22, the process 704 of FIG. 21 is illustrated in greater detail. The process begins at 710 and, in step 712, the cluster controller computer is booted and loaded. Next, in a step 714, the NACs 684 are polled and a "NAC list" is created by the cluster controller 682.

This "polling" of the NACs can be accomplished in several ways, as will be appreciated by those skilled in the art. For example, the cluster controller 682 can include a list of all NACs that have been authorized to be on the Clusternet network 686, and can then poll them one-by-one at their known address to determine if they are still on the Clusternet network 686 and if they are currently available. Alternatively, the cluster controller 682 can send out a inquiry to a range of addresses allocated for NACs, and can then add NACs to the NAC list as it receives responses from the polled NACs. The process 704 is then completed at 716.

In FIG. 39, the process 706 of FIG. 21 is illustrated in greater detail. The process 706 begins at 718 and, in a step 720, the origin of the packet is determined. That is, step 720 determines whether the packet came from the Intranet 690 or the Clusternet network 686. If the packet came from the Clusternet network, a step 722 determines whether the packet was addressed to the cluster controller 682. It does this by examining the address on the packet. If it was, the packet is processed in a step 724, and the process 706 is completed at 726. If step 722 determines that the packet was not for the cluster controller, it is determined in a step 728 whether it was for the Intranet. If so, a step 730 passes the packet to the Intranet. If step 728 determines that the packet is not for the Intranet, it will "drop" the packet 732 because it neither needs to use nor repeat the packet. By "drop" the packet, it is meant that the packet is simply not used by the cluster controller 682 although it may be stored, for example, for archival purposes. The process is then complete at 726.

If step 720 determines that the packet's origin is the Intranet, a step 734 determines whether it is for the cluster controller. If so, the packet is processed in a step 736, and the process 706 is completed at 726. If the packet was not for the cluster controller, it is determined whether it is for the Clusternet network 686. If it is, it is passed to the Clusternet network in a step 740, and if it is not, it is dropped in a "drop packet" step 742. In either case, the process is then completed at 726.

Figure 24:
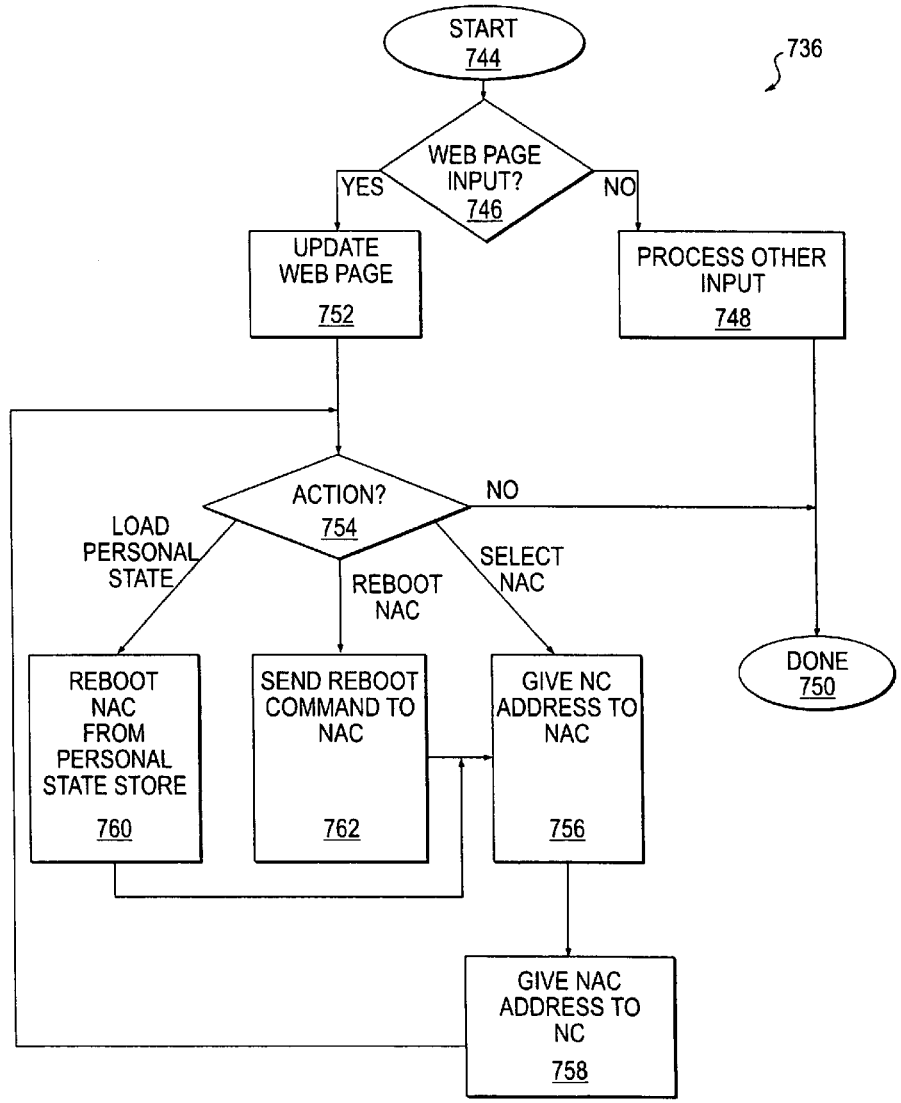
FIG. 24 is a flow diagram of the Process Packet process of FIG. 23.

In FIG. 24, the process 736 is illustrated in greater detail. The process 736 begins at 744 and, in a step 746, it is determined whether the packet is an input for the web page 698. If not, this "other" input is processed in a step 748, and the process is complete 750. If step 746 determines that it is a web page input, the web page image on the network computer 688 is updated, as required. Next, a step 754 determines whether an action is required. If not, the process is again completed at 750. If a "select" NAC action is required, step 756 gives the address of the network computer NC 688 to the NAC 684. Next, in a step 758, the NAC address is given to the NC, and process control is returned to step 754 for further action, if necessary.

If step 754 determines that the "load personal state" is desirable, a NAC is booted from the personal state stored, for example, on one of the hard drives 700 or on the hard drive 692. While the personal state 692 could be booted directly from disk drive 692 to an NAC, it is considered preferable to copy the personal state 696 to the disk drive 700 of the desired NAC 684, and to boot the personal state from this local hard drive. This is because booting is a very low-level process, which is most easily performed from a hard disk directly coupled to the NAC in a standard fashion.

Steps 756 and 758 are then performed and process control is returned to step 754. If action step 754 determines that the action is to reboot a NAC, a "reboot" command is sent to the NAC in a step 762 and then steps 756 and 758 are performed before returning process control to step 754. This "reboot" command can be a software or "soft" reboot command, or it can be a hardware or "hard" boot command to cycle the power off, and then on, for the NAC. Processes for sending soft reboot commands are well known to those skilled in the art, while a process and exemplary hardware for hard boot commands were discussed previously.

Figure 25:
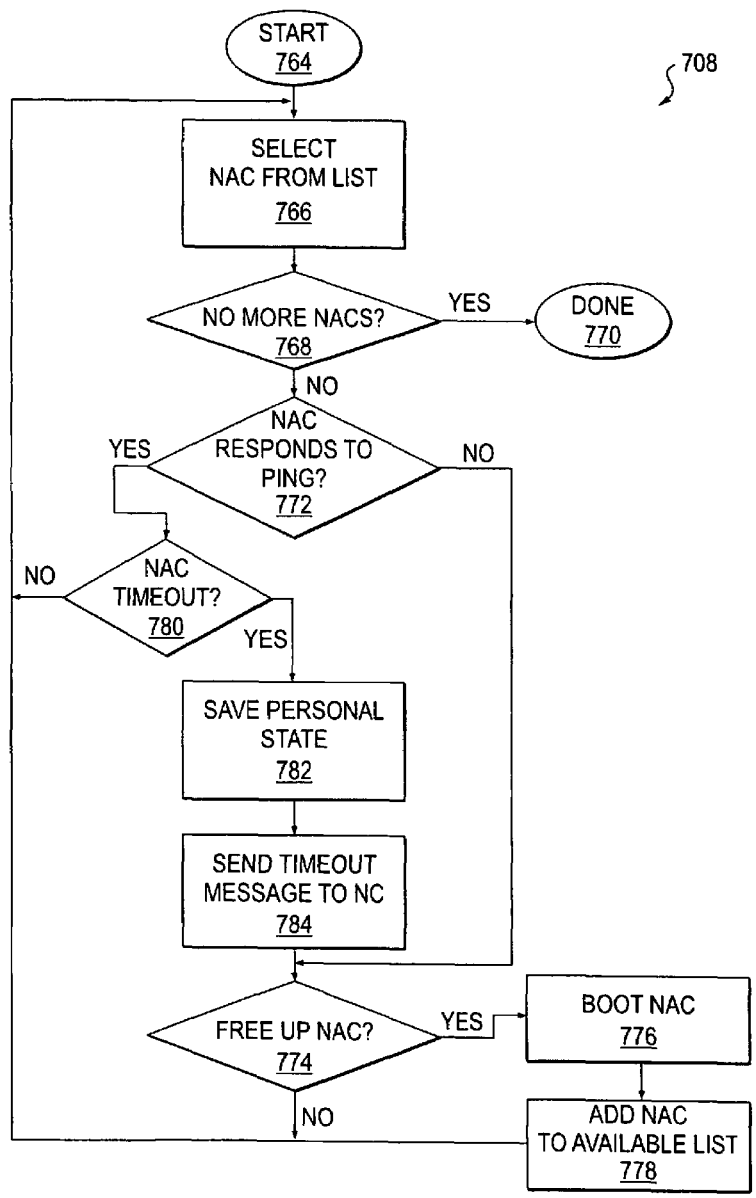
FIG. 25 is flow diagram of the Send Control Packets process of FIG. 21.

In FIG. 25, the process 708 of FIG. 21 is illustrated in greater detail. The process 708 allows the cluster controller 682 to monitor and control the operations of the NAC 684. More particularly, the process 708 starts at 764 and, in a step 768, a NAC is selected from the NAC list stored within the cluster controller 682 (e.g. stored on disk drive 692). If all the NACs on the list have already been selected by this process 708, the process is completed at 770. However, if not all the NACs have been selected from the list, the NAC is "pinged", and then a step 772 determines whether the NAC responds to the ping. By "ping" it is meant that an inquiry addressed to a particular NAC is sent over the Clusternet network to determine whether the NAC is still operating properly. If step 772 determines that the NAC does not respond to ping, a step 774 determines whether that NAC should be "freed up." If so, a step 776 reboots the NAC, and a step 778 adds the NAC to the available list of NACs stored on the cluster controller 682.

After completing step 778, or after a determination that the NAC should not be "freed up" by step 774, process control is returned to step 766 to select any other NAC from the list. If step 772 determines that the NAC did respond to the ping, a step 780 determines whether there is a NAC time out. A NAC time out occurs when no data has been sent from the NC controlling that particular NAC for a period of time, e.g. ten minutes. If there is not a NAC time out, process control is returned to step 766. If there is a NAC time out, the personal state of that particular NAC is saved, and a "time out" message is sent to the NC to inform it that it has timed out. Process control is then returned to step 774.

It should be noted that under certain circumstances when a NAC times out, step 774 might determine that the NAC should not be "freed up", i.e. that even though the connection with the NC is terminated, that the NAC should be allowed to continue to operate as initiated from the NC. This might happen in certain applications where a network computer starts an extended computation, such as a 3-D image rendering, which may take many hours, but does not wish to remain connected to the NAC performing the 3-D image rendering for the entire period of time. The NC is then "disconnected" from the NAC (by sending appropriate commands to the NC and NAC and by recording it as such in the memory of the cluster controller), but the NAC is allowed to "free-run." After the 3-D rendering is complete, it can be stored to hard disk, or the user can use an NC to reconnect to the NAC (that was previously free-running), again with suitable commands to the NC, NAC, and by updating the cluster controller information, to view the results of the NAC's computations.

Figure 26:
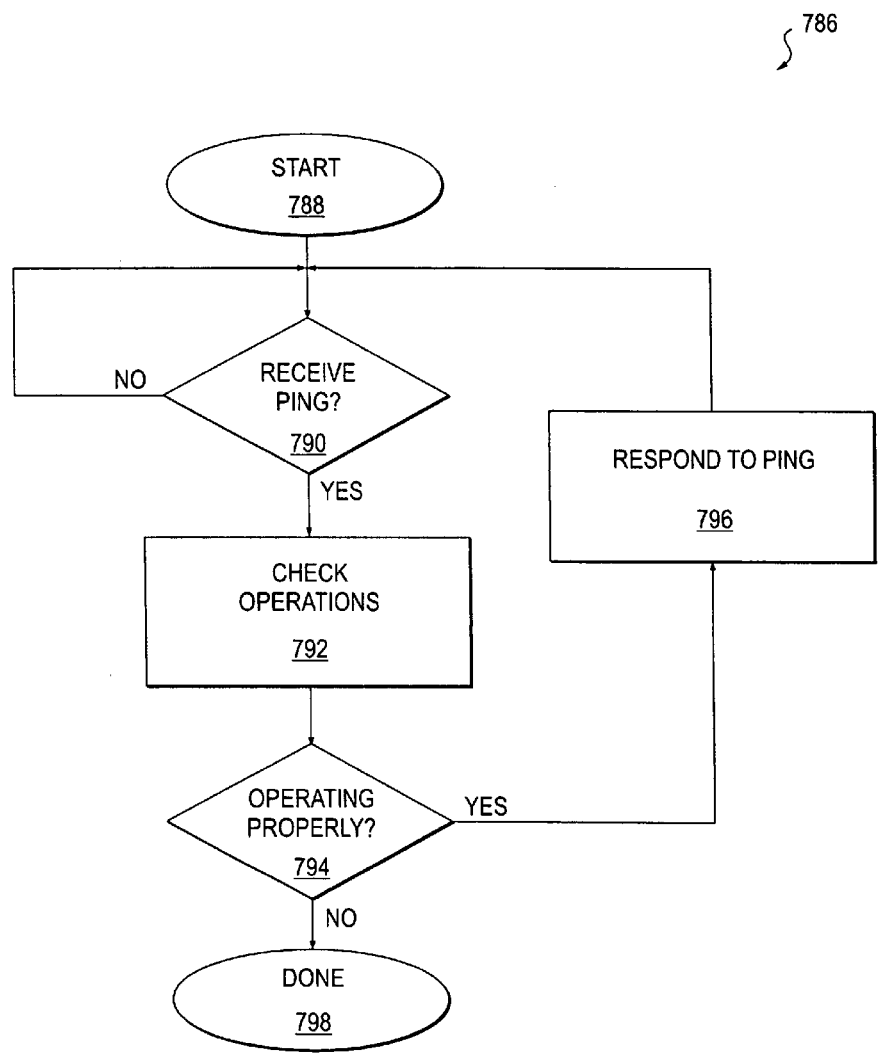
FIG. 26 is a flow diagram of a utility running on the NAC of FIG. 20 which permits the cluster controller to monitor the operation of the NAC.

In FIG. 26, a process 786 running on a NAC 684 is used to respond to the "ping" sent by the cluster controller 682. This process 784 can run concurrently with the virtual machine software previously described. More particularly, process 786 begins at 788 and, in a decision step 790, it is determined whether the NAC has received a ping. If not, process control is returned to step 790 to await a ping.

If step 790 determines that a ping has been received, a step 792 checks the operation of the NAC 684. If the NAC is operating properly as determined by step 794, the NAC 684 responds to the ping, i.e. the NAC sends response addressed to the cluster controller 682, to indicate that it is operating properly, and process control is returned to step 790. If step 794 determines that the computer is not operating properly, the process 682 is done as indicated at 798. Also, if the NAC 684 has completely "crashed," process 786 obviously will not be running and, therefore, the NAC 684 will not respond to the ping of the cluster controller 682. If the cluster controller does not receive a response to a ping, it will assume that the NAC 684 is either malfunctioning or has crashed, and will most likely come to the decision that the NAC should be rebooted.

While this invention has been described in terms of several preferred embodiments, it will be appreciated that there are alterations, permutations, and equivalents which fall within the scope of this invention. It should also be noted that there are alternative ways of implementing both the process and apparatus of the present invention. For example, the described methods pertaining to the host computer are generally described in terms of a Macintosh computer system. It will therefore be apparent to those skilled in the art that when the host computer processes are implemented on other computer systems, such as MS-DOS, Microsoft Windows 95, and UNIX computer systems, that the methodology may require some modification. However, such modifications will become readily apparent to those skilled in the art after studying preceding descriptions and studying the drawings.

It is therefore intended that the following appended claims cover all such alterations, permutations, and equivalents that fall within the true spirit and scope of the present invention.

What is claimed is:

1. A cluster computer system comprising:
   a plurality of network accessible computers each having a unique address with respect to a network, each including a central processing unit and non-volatile memory, where each of said network accessible computers is coupled to said network, where said network accessible computers implement host computer programs which permit the network accessible computers to operate as host computers for client computers coupled to said network, where a client computer controls the functionality of a host computer after being downloaded from said host computer a client program to run on said client computer that includes the ability to communicate with said host computer program, whereby an input device of said client computer can be used to generate inputs to said host computer, and such that image information generated by said host computer can be viewed in a window of said client computer; and
   a cluster administration computer coupled to said network to monitor the operation of said network accessible computers;
   wherein said network is a TCP/IP protocol network, and wherein said host computer programs are responsive to keyboards and pointing devices of said client computers as transmitted to said host computers over said TCP/IP protocol network under the control of client programs running on said client computers, said host programs transmitting said image information to said client computers over said TCP/IP protocol network for display in browser windows of browser programs running on said client computers;
   wherein said cluster administration computer is operative to control at least one function of said network accessible computers; and
   wherein said at least one function is to reset a selected network accessible computer.

2. A cluster computer system as recited in claim 1 wherein said plurality of network accessible computers are coupled to said network with a corresponding plurality of communication channels.

3. A cluster computer system as recited in claim 1 wherein said plurality of network accessible computers also each include volatile memory and data bus controllers.

4. A cluster computer system as recited in claim 1 wherein said cluster administration computer is coupled to said network to receive inputs from other computer systems coupled to said network.

5. A cluster computer system as recited in claim 1 wherein said client programs are transmitted to said client computers over said TCP/IP protocol network.

6. A cluster computer system as recited in claim 5 wherein said client programs are Java Applet programs.

7. A cluster computer system as recited in claim 1 wherein said cluster administration computer is running a cluster administration program which administers the connection of a client computer to a host computer.

8. A cluster computer system as recited in claim 1 wherein said cluster administration computer is operative to process a TCP/IP compatible data packet received over said TCP/IP protocol network, where said cluster administration computer is operative to determine the origin and destination of said TCP/IP data packet.

9. A cluster computer system as recited in claim 1 wherein said cluster administration computer is operative to create a list of available network accessible computers.

10. A cluster computer system comprising:
    a plurality of network accessible computers each having a unique address with respect to a network, each including a central processing unit and non-volatile memory, where each of said network accessible computers is coupled to said network, where said network accessible computers implement host computer programs which permit the network accessible computers to operate as host computers for client computers coupled to said network, where a client computer controls the functionality of a host computer after being downloaded from said host computer a client program to run on said client computer that includes the ability to communicate with said host computer program, whereby an input device of said client computer can be used to generate inputs to said host computer, and such that image information generated by said host computer can be viewed in a window of said client computer; and
    a cluster administration computer coupled to said network to monitor the operation of said network accessible computers;
    wherein said network is a TCP/IP protocol network, and wherein said host computer programs are responsive to keyboards and pointing devices of said client computers as transmitted to said host computers over said TCP/IP protocol network under the control of client programs running on said client computers, said host programs transmitting said image information to said client computers over said TCP/IP protocol network for display in browser windows of browser programs running on said client computers; and
    wherein said cluster administration computer serves to coordinate the sharing of at least one local resource by said network accessible computers.

11. A cluster computer system as recited in claim 10 wherein said at least one local source is a data storage device.

12. A cluster computer system as recited in claim 10 wherein said cluster administration computer is operative to control at least one function of said network accessible computers.

13. A method for providing access to host computers by a client computer over a computer network comprising:
    receiving a request for a host computer coupled to a computer network from a client computer coupled to said computer network, said request received by a cluster administration computer, wherein the relationship of said host computer to said client computer is to be such that after said client computer becomes associated with a host computer by being downloaded from said host computer a client program that includes the ability to communicate with a host computer program running on said host computer, an input device of said client computer can be used to generate inputs to said host computer, and such that image information generated by said host computer can be viewed by said client computer;
    determining a suitable host computer for said client computer by said cluster administration computer, wherein determining a suitable host computer includes receiving the desired requirements for a host computer from said client computer, and comparing said desired requirements to the characteristics of available host computers on said computer network;

informing said client computer of the network address of said suitable host computer by said cluster administration computer, whereby said client computer can become associated with said host computer;

loading a personal state of a client using said client computer into said network accessible computer that will serve as said suitable host computer; and monitoring the functionality of a plurality of network accessible computers by said cluster administration computer;

whereby monitoring the functionality of a plurality of network accessible computers includes resetting a network accessible computer if it is determined that it is not functioning properly.

14. A computer program product comprising a computer readable media having program instructions embodied on said media for implementing the method of claim 13.

* * * * *

UNITED STATES PATENT AND TRADEMARK OFFICE
CERTIFICATE OF CORRECTION

| | | |
|---|---|---|
| PATENT NO. | : 7,007,070 B1 | Page 1 of 1 |
| APPLICATION NO. | : 08/810620 | |
| DATED | : February 28, 2006 | |
| INVENTOR(S) | : Paul L. Hickman | |

It is certified that error appears in the above-identified patent and that said Letters Patent is hereby corrected as shown below:

Title Page, in Paragraph (76), after Inventor Paul L. Hickman, add:

Michael L. Gough, 18324 Purdue Drive, Saratoga, CA 95070

Signed and Sealed this

Twentieth Day of December, 2011

David J. Kappos
*Director of the United States Patent and Trademark Office*